United States Patent
Chen et al.

(10) Patent No.: US 7,451,362 B2
(45) Date of Patent: Nov. 11, 2008

(54) METHOD AND SYSTEM FOR ONBOARD BIT ERROR RATE (BER) ESTIMATION IN A PORT BYPASS CONTROLLER

(75) Inventors: Chung-Jue Chen, Irvine, CA (US); Ali Ghiasi, Cupertino, CA (US); Jay Proano, Rancho Santa Margarita, CA (US); Rajesh Satapathy, Lake Forest, CA (US); Steve Thomas, Riverside, CA (US)

(73) Assignee: Broadcom Corporation, Irvine, CA (US)

( * ) Notice: Subject to any disclaimer, the term of this patent is extended or adjusted under 35 U.S.C. 154(b) by 658 days.

(21) Appl. No.: 10/779,001

(22) Filed: Feb. 13, 2004

(65) Prior Publication Data

US 2005/0132258 A1 Jun. 16, 2005

Related U.S. Application Data

(60) Provisional application No. 60/529,145, filed on Dec. 12, 2003, provisional application No. 60/529,200, filed on Dec. 12, 2003, provisional application No. 60/529,143, filed on Dec. 12, 2003, provisional application No. 60/529,421, filed on Dec. 12, 2003.

(51) Int. Cl.
*G06F 11/00* (2006.01)
(52) U.S. Cl. .................................. 714/704; 714/819
(58) Field of Classification Search ............... 714/704, 714/819
See application file for complete search history.

(56) References Cited

U.S. PATENT DOCUMENTS

| | | | |
|---|---|---|---|
| 4,667,320 A * | 5/1987 | Onno et al. | 370/380 |
| 4,891,812 A * | 1/1990 | Bocci et al. | 714/708 |
| 5,191,565 A * | 3/1993 | Inoue et al. | 369/284 |
| 5,448,616 A * | 9/1995 | Kaewell et al. | 714/712 |
| 6,522,650 B1 * | 2/2003 | Yonge et al. | 370/390 |
| 6,885,711 B2 * | 4/2005 | Shiu et al. | 375/340 |
| 7,032,139 B1 * | 4/2006 | Iryami et al. | 714/704 |
| 7,093,172 B2 * | 8/2006 | Fan et al. | 714/716 |
| 7,120,721 B1 * | 10/2006 | Tuttle et al. | 710/305 |
| 2003/0033463 A1 * | 2/2003 | Garnett et al. | 710/300 |
| 2004/0081186 A1 | 4/2004 | Warren et al. | |

* cited by examiner

*Primary Examiner*—Mujtaba K Chaudry
(74) *Attorney, Agent, or Firm*—McAndrews, Held & Malloy, Ltd.

(57) ABSTRACT

Certain aspects of the method may comprise receiving via a first port of the port bypass controller, a data stream comprising at least one known bit pattern. Upon locking onto at least a portion of the known bit pattern in the received data stream, a bit error rate may be generated based on a bit-by-bit comparison of at least a portion of the data stream received after locking occurs. At least a portion of the data stream may be compared with a corresponding portion of expected data. The bit error rate may be calculated based on results from comparing at least a portion of the data stream with a corresponding portion of the expected data. The known bit pattern may be internally generated within the port bypass controller or it may be externally generated by a host system.

31 Claims, 16 Drawing Sheets

METHOD AND SYSTEM FOR ONBOARD BIT ERROR RATE (BER) ESTIMATION IN A PORT BYPASS CONTROLLER

CROSS-REFERENCE TO RELATED APPLICATIONS/INCORPORATION BY REFERENCE

This application makes reference to, claims priority to, and claims the benefit of:

U.S. Provisional Application Ser. No. 60/529,145 filed Dec. 12, 2003;
U.S. Provisional Application Ser. No. 60/529,200 filed Dec. 12, 2003;
U.S. Provisional Application Ser. No. 60/529,143 filed Dec. 12, 2003; and
U.S. Provisional Application Ser. No. 60/529,421 filed Dec. 12, 2003.

This application also makes reference to:
U.S. application Ser. No. 10/779,234 filed Feb. 13, 2004;
U.S. application Ser. No. 10/779,232 filed Feb. 13, 2004;
U.S. application Ser. No. 10/779,233 filed Feb. 13, 2004;
U.S. application Ser. No. 10/767,729 filed Jan. 30, 2004; and
U.S. application Ser. No. 10/767,748 filed Jan. 30, 2004.

The above stated applications are hereby incorporated herein by reference in their entirety.

FIELD OF THE INVENTION

Certain embodiments of the invention relate to port bypass controllers. More specifically, certain embodiments of the invention relate to a method and system for onboard bit error rate (BER) estimation in a port bypass controller.

BACKGROUND OF THE INVENTION

FIG. 1a is a block diagram 120 of a conventional networking environment illustrating the arrangements of various communication and storage entities. Referring to FIG. 1a, there is shown a wide area network (WAN) 110 comprising a plurality of local area networks (LANs) 102, 104, 106, 108 and a router 132. The LANs 102, 104, 106, 108 are coupled via the router 132. The LAN 102 comprises PCs 112, 116, 120, servers 126, 128 and data storage elements 114, 118, 122, 124 and 130.

The data storage element 114 may be coupled to the PC 112, the data storage element 118 may be coupled to the PC 116 and the data storage element 122 may be coupled to the PC 120. The data storage element 124 may be coupled to the server 126 and the data storage element 130 may be coupled to the server 128. The LANs 104, 106, 108 may also comprise a plurality of PCs, data storage elements and servers which may be configured in a somewhat similar manner as in LAN 102.

In operation, the PCs 112, 116, 120 may communicate with each other and with the servers 126, 128 via the LAN 102. The PCs 112, 116, 120 may communicate with communication entities coupled to the LANs 104, 106, 108 via the router 132. Additionally, the communication entities coupled to the LANs 104, 106, 108 may also communicate with the PCs 112, 116, 120, servers 126, 128, and the data storage elements 114, 118, 122, 124, 130 via the router 132.

A major drawback with the configuration of the conventional networking environment of FIG. 1a is that the bandwidth of the PC's connection or link to the LAN and the server's connection or link to the LAN may severely affect the performance of a communication network. Furthermore, the processing bandwidth of the PC's and the servers may further decrease system performance by introducing delays, which results in increased system latency. For example, it may be desirable for PC 112 to communicate with PC 120 in order to acquire information from the data storage element 122. Accordingly, if the network connections coupling the PC 112 and the PC 120 are slow, then these connections will limit communication between PC 112 and PC 120. Performance of the communication between PC 112 and PC 120 may be further limited or degraded in cases where the processing bandwidth for the PC 112 and PC 120 are low. Furthermore, during operation, multiple PCs may be attempting to communicate with the PC 120 in order to acquire information from the data storage element 120 while the PC 112 is simultaneously communicating with the PC 120. In this regard, as the number of communication entities attempting to acquire information from the data storage element 122 increases, the limited processing bandwidth and communication bandwidth of the PC 112 and the PC 120 may result in further delays and increased latency. The PCs 112, 116, 120, therefore, become bottlenecks.

In another example, it may be desirable for PC 120 to communicate with server 126 in order to acquire information from the data storage element 124. Accordingly, if the network connections coupling the PC 120 and the server 126 are slow, then these connections will limit communication between PC 120 and server 126. Performance of the communication between PC 120 and server 126 may be further limited or degraded in cases where the processing bandwidth for the PC 120 and server 126 are low. Furthermore, during operation, multiple PCs such as PCs 112, 116 may be attempting to communicate with the server 126 in order to acquire information from the data storage element 124, while the PC 120 is simultaneously communicating with the server 126. In this regard, as the number of communication entities attempting to acquire information from the data storage element 124 via the server 126 increases, the limited processing bandwidth and communication bandwidth of the PC 120 and the server 126 result may result in further delays and increased latency. Although the bandwidth of the connections of the PCs and servers to the LAN may be increased by adding higher bandwidth connections, this can be a costly venture. Similarly, the processing bandwidth may also be increased by adding faster processors but the cost may be prohibitive.

FIG. 1b is a block diagram 130 of an improved conventional networking environment illustrating the arrangements of various communication and storage entities, which addresses some of the drawbacks of the networking environment of FIG. 1a. Referring to FIG. 1b, there is shown a wide area network (WAN) 110 comprising a plurality of local area networks (LANs) 102, 104, 106, 108 and a router 132. The LANs 102, 104, 106, 108 are coupled via the router 132. The LAN 102 comprises PCs 112, 116, 120, servers 126,128 and data storage elements 132 and 134.

The data storage element 134 may comprise a plurality of storage devices such as a disk array, which may be coupled to the server 126. The data storage element 136 may also comprise a plurality of storage devices such as a disk array, which may be coupled to the server 128. The LANs 104, 106, 108 may also comprise a plurality of PCs, data storage elements and servers which may be configured in a somewhat similar manner as in LAN 102.

During operation, the PCs 112, 116, 120 may communicate with each other and with the servers 126, 128 via the LAN 102. The PCs 112, 116, 120 may also communicate with communication entities coupled to the LANs 104, 106, 108 via the router 132. Additionally, the communication entities coupled to the LANs 104, 106, 108 may also communicate with the PCs 112, 116, 120, servers 126, 128, and the data storage elements 134, 136.

When compared to the networking environment of FIG. 1a, the servers 126, 128 may be configured so that they have much greater communication and processing bandwidth that the PCs 112, 116, 120. Notwithstanding, although the networking environment configuration of FIG. 1b may provide better performance than the networking environment of FIG. 1a, one drawback with the configuration of FIG. 1b is that the servers 126, 128 are now bottlenecks. In this regard, as the number of connections to the servers requesting information from the data storage entities 134, 136 increases, the servers themselves will become bottlenecks resulting is degradation of system performance. For example, in instances when the PCs 112, 116, 120 and other networking communication entities coupled to the LANs 104, 106, 108 simultaneously acquire information from the servers 126 and/or 128, some connections may be blocked since the servers 126 may not have the capacity to handle all the connections.

FIG. 1c is a block diagram 140 of an improved conventional networking environment illustrating the arrangements of various communication and storage entities, which addresses some of the drawbacks of the networking environment of FIG. 1a and FIG. 1b. Referring to FIG. 1c, there is shown a wide area network (WAN) 110 comprising a plurality of local area networks (LANs) 102, 104, 106, 108, a router 132 and a storage area network (SAN) 142. The LANs 102, 104, 106, 108 are coupled via the router 132. The LAN 102 comprises PCs 112, 116, 120 and servers 126, 128. The storage area network 142 comprises data storage elements 144, 146 and 148.

The data storage elements 144, 146, 148 may comprise a plurality of storage devices such as disk arrays, which may be coupled to the servers 126, 128 via the storage access network 142. Each of the LANs 104, 106, 108 may also comprise a plurality of PCs and servers which may be configured in a somewhat similar manner as in LAN 102. One or more servers coupled to the LANs 104, 106, 108 may also be coupled to the storage area network 142 or may communicate with data storage elements 144, 146, 148 via the storage area network 148. Since any of the LANs 102, 104, 106, 108 may communicate directly or indirectly with the storage area network 142, information stored in the data storage elements 144, 146, 148 may be more readily accessible without encountering the bottlenecks previously associated with the networking environments of FIG. 1a and FIG. 1b.

FIG. 2 is a block diagram of an exemplary local area network (LAN) coupled to a storage area network (SAN). Referring to FIG. 2, there is shown LANs 202, 204, 206, 208 and storage access network (SAN) 240. The LAN 202 may comprise PCs 210, 212, 214, and servers 216, 218. The storage area network 240 may comprise a fibre channel (FC) switch 224, file servers (FSs) 226, 228, 230 and a plurality of data storage elements 232, 234, 236. Each of the data storage elements 232, 234, 236 may comprise a plurality of fibre channel hard disks.

The storage access network 240 may be coupled to the LAN 202 via host bus adapters (HBAs) 220, 222, which interfaces with the servers. In this regard, the host bus adapter 220 may be configured to interface with the fibre channel switch 224 and the server 216, and the host bus adapter 222 may be configured to interface with the fibre channel switch 224 and the server 218. The file server 226 may be coupled to the data storage element 232, the file server 228 may be coupled to the data storage element 234 and the file server 230 may be coupled to the data storage element 236.

The file servers 216, 218 may comprise a plurality of ports to which a data storage device such as a hard disk may be coupled. Each of the file server's plurality of ports may be electrically and/or optically coupled to a single storage element such as a hard disk. In this regard, each of the file servers 226, 228, 230 supports a single point-to-point connection with a particular hard disk.

The fibre channel switch 224 may be adapted to switch connections between servers and the file servers. For example, the fibre channel switch 224 may be adapted to switch connections from the server 216 to any of the file servers 226, 228, 230 in order to provide access to the data storage elements 232, 234, 236 respectively. Similarly, the fibre channel switch 224 may be adapted to switch connections from the server 216 to any of the file servers 226, 228, 230 in order to provide access to any one or more of the data storage elements 232, 234, 236 respectively.

In operation, PC 214 may utilize any of the servers 216, 218 to retrieve information from any of the file servers 232, 234, 236. In a case where PC 214 establishes a connection with server 216 in order to retrieve information from the file server 236, then the fibre channel switch 224 may switch the connection from the server 216 to the file server 236. In another example, a communication device coupled to LAN 204 may establish a connection with server 218 in order to retrieve information from the file server 234. The fibre channel switch 224 may switch the connection from the server 218 to the file server 234.

Although the networking environment of FIG. 2 provides significantly increased performance over the conventional networking environments illustrated in FIG. 1a, FIG. 1b and FIG. 1c, a major drawback with the networking environment of FIG. 2 is its point-to-point communication link existing between each of the hard disks and each of the plurality of file server ports. In particular, the point-to-point communication links existing between each of the hard disks and the file server ports can be quite expensive to operate and/or maintain.

Since data availability is the lifeline of every business, data loss is not only intolerable but its loss may interrupt daily operation and cause significant loss of revenue. In order to improve data availability, components with higher MTBF are required and systems are generally subjected to and are required pass a rigorous suite or battery of tests. In order to prevent data loss, storage systems which utilize, for example, fibre channel (FC) drives, are designed with a dual loop architecture which is adapted to facilitate data access through the second loop which may be utilized to provide redundancy.

FIG. 3 is a block diagram of a conventional fibre channel arbitrated loop arrangement which may be utilized for coupling a plurality of hard disks which may be found in the data storage entities of FIG. 1a, FIG. 1b, FIG. 1c and FIG. 2. Referring to FIG. 3, there is shown a server 302, a host bus adapter 304, and a plurality of hard disks, namely, 306a, 306b, 306c, 306d, 306e, 306f, 306g, 306h, 306i, 306j and 306k. Each of the hard disks 306a, . . . , 306k may comprise a port bypass controller and repeater (PBC/R) block. Each of the port bypass controller and repeater blocks may comprise a dual port architecture for redundancy.

The host bus adapter 304 interfaces with the server 302 and couples the hard disks to the server 302. The hard disks 306a, . . . , 306k are arranged in a loop or ring configuration with the first hard disk 306a in the ring coupled to the host bus adapter 304. The second hard disk 306b is coupled to the first hard disk 306b and the third hard disk 306c is coupled to the second hard disk 306b. The remaining hard disks are coupled or chained in a similar arrangement with the last hard disk 306k in the chain or loop being coupled to the host bus adapter 304. The last hard disk 306k is also chained to hard disk 306j. The fibre channel arbitrated loop (FC-AL) arrangement is a ring arrangement that is somewhat similar in arrangement to a token ring configuration, but only with regard to their configuration. With regard to its operation, the fibre channel arbitrated loop does not utilize a token for facilitating communication between nodes on the loop. Rather, the fibre channel arbitrated loop utilizes an arbitrated loop address to facilitate communication between the nodes that are coupled to the loop.

Each of the hard disks that are on the fibre channel arbitrated loop, which may also be referred as a ring, share the bandwidth allocated for the loop. Communication over the loop occurs on a point-to-point basis between an initiating hard disk and a destination hard disk. At any particular instant during which communication occurs over the loop, only two (2) ports, may be active at the same time. The two ports that are active include the port that won loop arbitration and the port that is in communication that won the arbitration. The port that has won the arbitration may be referred to as the initiating port and the port in communication with the port that won the arbitration may be referred to as the destination port. Traffic does not have to be routed between the initiating port and destination port since there is point-to-point communication between the initiating port and the destination port. During communication, ports other than the initiating port and the destination port in the loop are adapted to receive frames and forward the received frames to successive ports in the loop. The received frames may be data frames and control frames such as acknowledgements and ready frames. A major drawback with this type of receive and forward scheme is the increased latency penalty introduced and incurred by each successive port in the loop.

Some fibre channel arbitrated loop implementations such as the implementation illustrated in FIG. 3 were based on analog port bypass controller (PBC) and repeaters (R). The combination of loop architecture with the port bypass controller were prone to problems which often resulted in catastrophic loop failures since one hard disk could potentially affect the operation of all the other hard disks in the loop. These port bypass controller implementations required operators or service technicians to insert and/or remove each hard disk individually in order to determine and/or isolate the actual location of a loop failure or failed hard disk. Furthermore, an overwhelming majority of these failures were signal integrity related.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for bit error rate estimation in a port bypass controller. Aspects of the method may comprise receiving via a first port of the port bypass controller, a data stream comprising at least one known bit pattern. Upon locking onto at least a portion of the known bit pattern in the received data stream, a bit error rate may be generated based on a bit-by-bit comparison of at least a portion of the data stream received after locking occurs. At least a portion of the data stream may be compared with a corresponding portion of expected data. The bit error rate may be calculated based on results from comparing at least a portion of the data stream with a corresponding portion of expected data.

The known bit pattern may be internally generated within the port bypass controller or it may be externally generated by a host system. In another aspect of the invention, the method may comprise selecting the first port of the port bypass controller and transferring the data stream to the selected port of the port bypass controller. The data stream may comprise standardized stress frame patterns, a plurality of user defined transmission words and/or a plurality of ordered set sequences.

Another embodiment of the invention may provide a machine-readable storage, having stored thereon, a computer program having at least one code section for executable by a machine, thereby causing the machine to perform the steps as described above for bit error rate estimation in a port bypass controller.

Aspects of the system may comprise a first port of the port bypass controller that receives a data stream comprising at least one known bit pattern. After the ports lock onto at least a portion of the known bit pattern in the received data stream, a bit error rate may be generated by at least one processor based on a bit-by-bit comparison of at least a portion of the data stream received after locking occurs. At least a portion of the data stream may be compared with a corresponding portion of expected data by the processor. The processor may calculate the bit error rate based on results from comparing at least a portion of the data stream with a corresponding portion of expected data. The known bit pattern may be internally generated within the port bypass controller or it may be externally generated by a host system. In another aspect of the invention, the method may comprise selecting the first port of the port bypass controller and transferring the data stream to the selected port of the port bypass controller. The data stream may comprise standardized stress frame patterns, a plurality of user defined transmission words and/or a plurality of ordered set sequences.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1b is a block diagram of an improved conventional networking environment illustrating the arrangements of various communication and storage entities, which addresses some of the drawbacks of the networking environment of FIG. 1a.

that may be utilized in connection with onboard BER estimation in a port bypass controller, in accordance with an embodiment of the invention.

Figure 5:
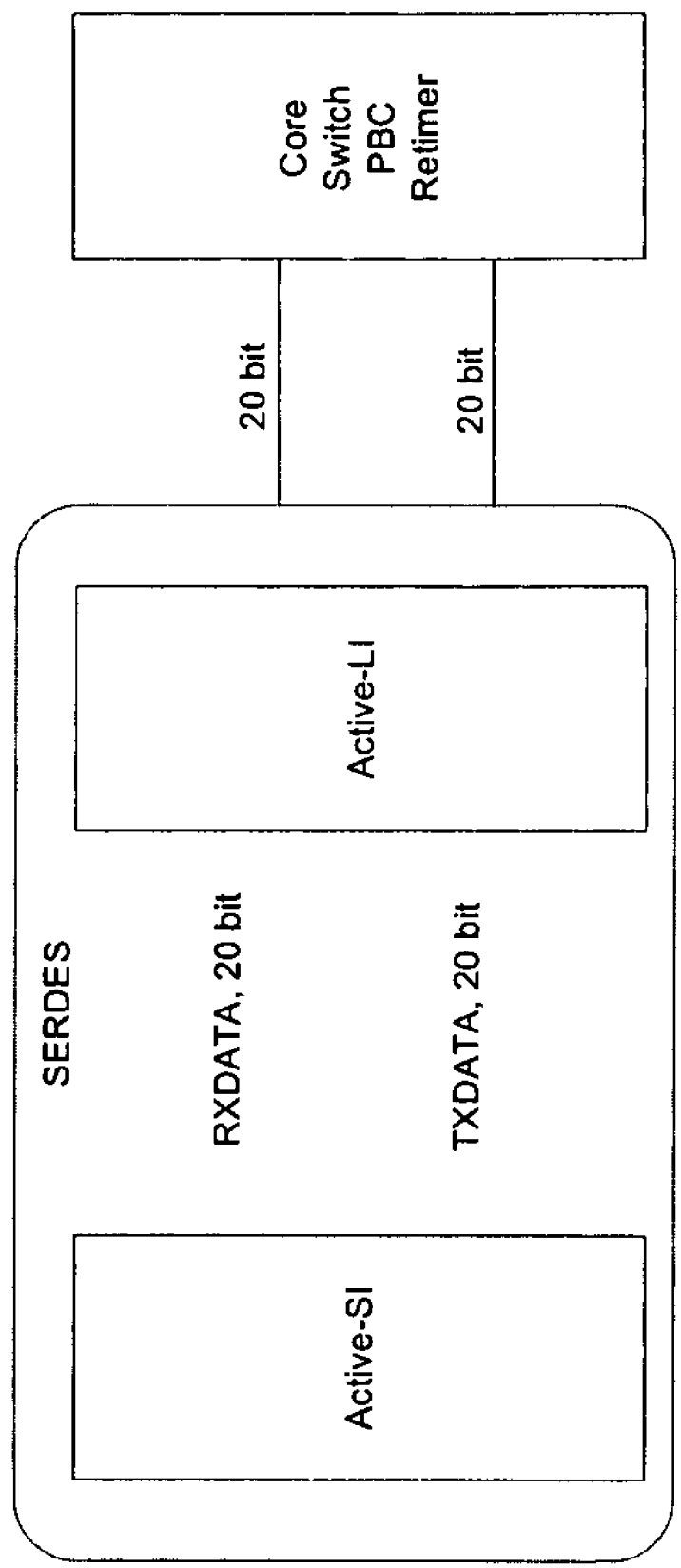

FIG. 5 is a block diagram illustrating an exemplary Active-SI/LI SERDES that may be utilized in connection with bit error rate estimation in a port bypass controller, in accordance with an embodiment of the invention.

Figure 6:
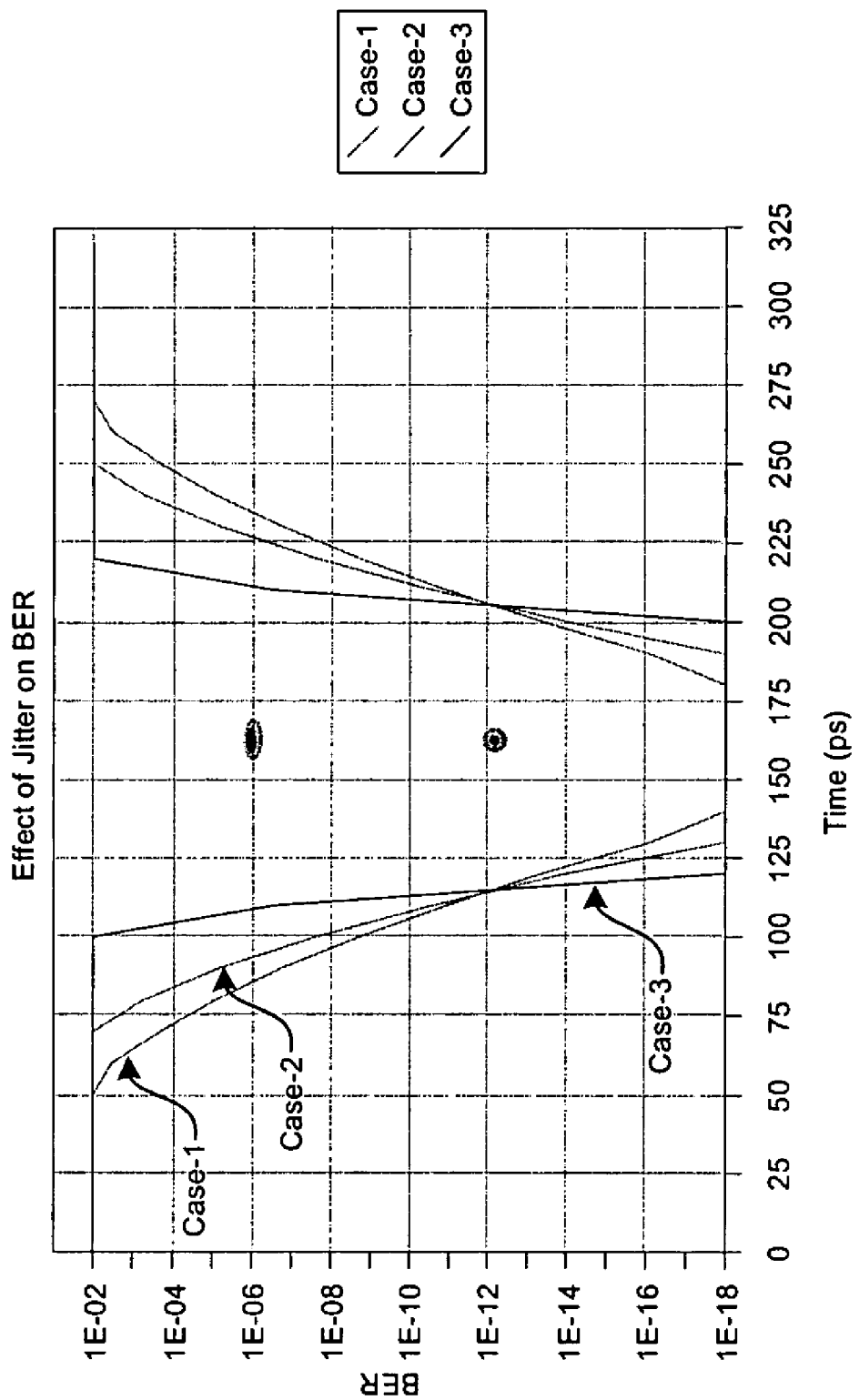

FIG. 6 is a graph illustrating three links, that may be may be utilized in connection with onboard bit error rate estimation in a port bypass controller, in accordance with an embodiment of the invention.

Figure 7:
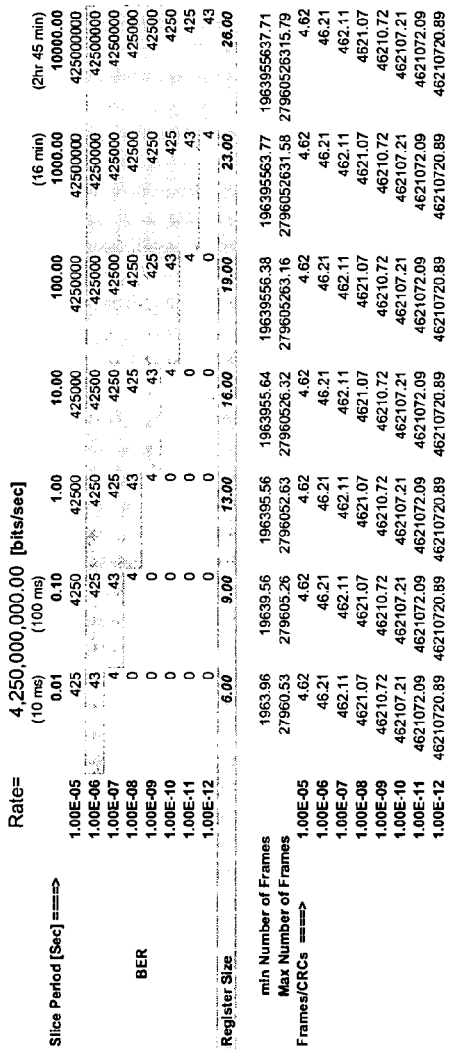

FIG. 7 illustrates exemplary calculations for a fibre channel rate of 4.25 Gbps and the CRC error count with different BERs for various slice periods that may be utilized in connection with BER testing in a port bypass controller, in accordance with an embodiment of the invention.

Figure 8:
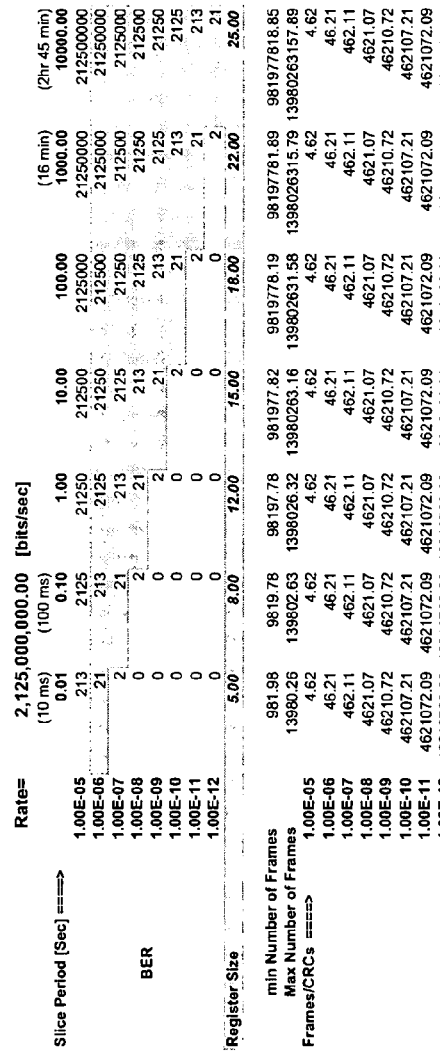

FIG. 8 illustrates exemplary calculations for a fibre channel rate of 2.125 and the CRC error count with different BERs for various slice periods that may be utilized in connection with BER testing in a port bypass controller, in accordance with an embodiment of the invention.

Figure 9:
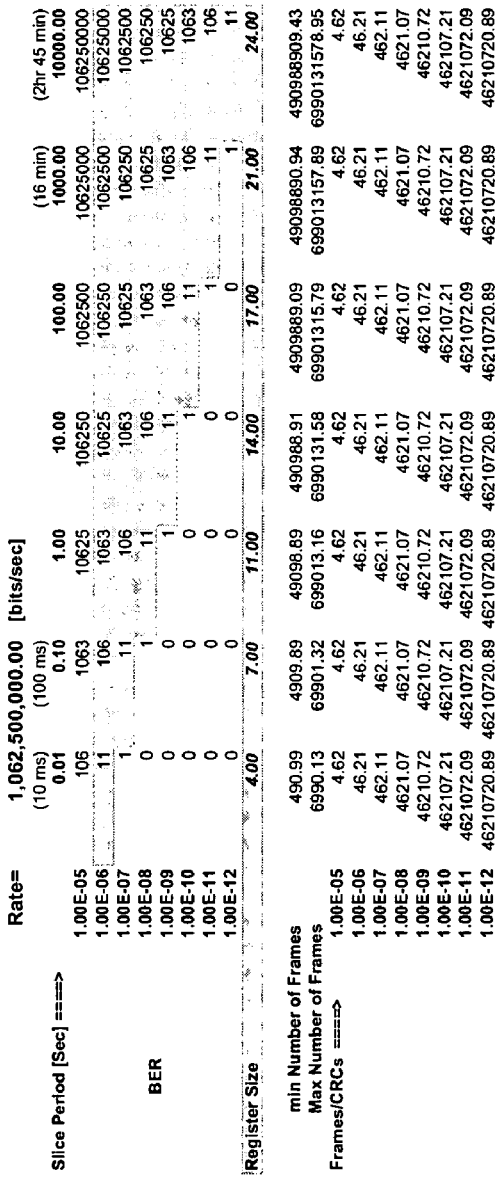

FIG. 9 illustrates exemplary calculations for a fibre channel rate of 1.0625 Gbps and the CRC error count with different BERs for various slice periods that may be utilized in connection with BER testing in a port bypass controller, in accordance with an embodiment of the invention.

Figure 10:
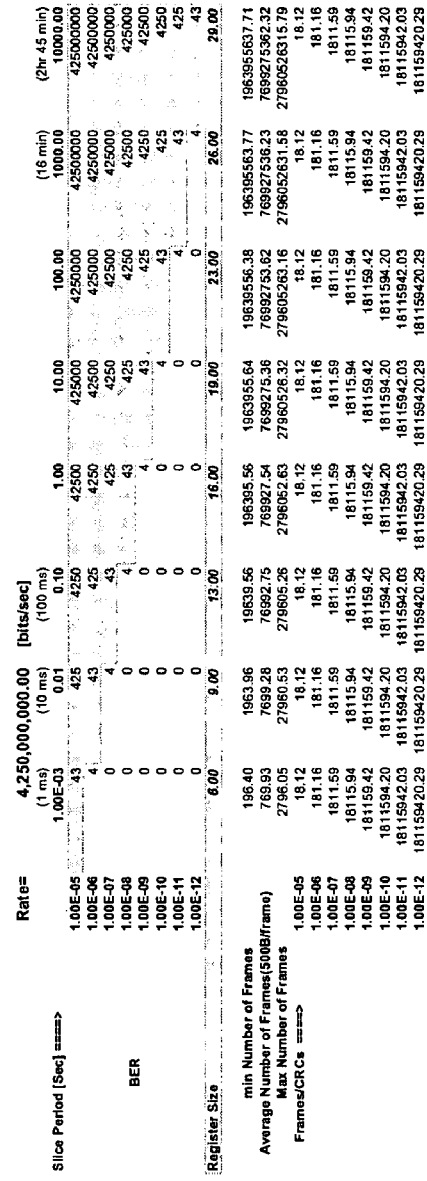

FIG. 10 illustrates exemplary calculations for a fibre channel rate of 4.25 Gbps and the CRC error count with different BERs for various slice periods that may be utilized in connection with BER testing in a port bypass controller, in accordance with an embodiment of the invention.

Figure 11:
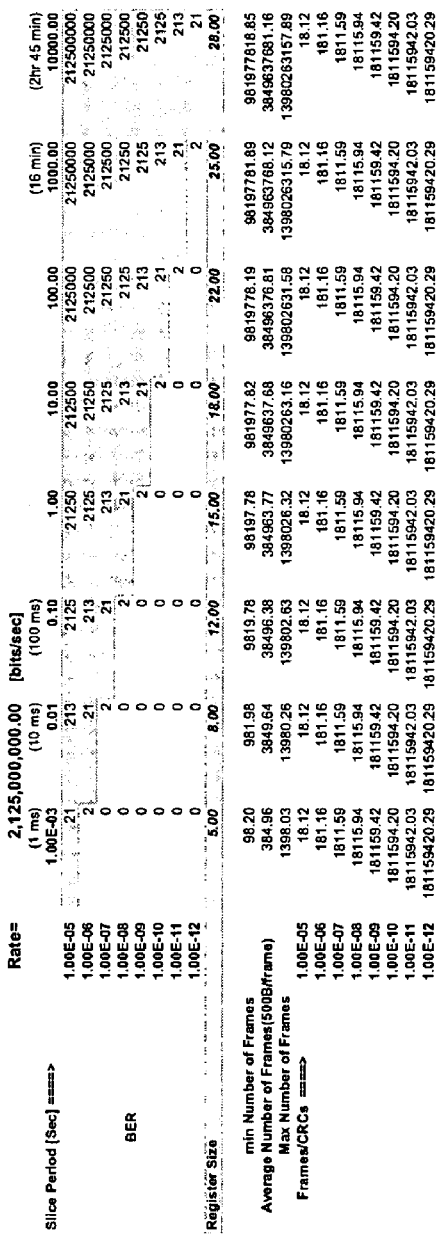

FIG. 11 illustrates exemplary calculations for a fibre channel rate of 2.125 Gbps and the CRC error count with different BERs for various slice periods that may be utilized in connection with BER testing in a port bypass controller, in accordance with an embodiment of the invention.

Figure 12:
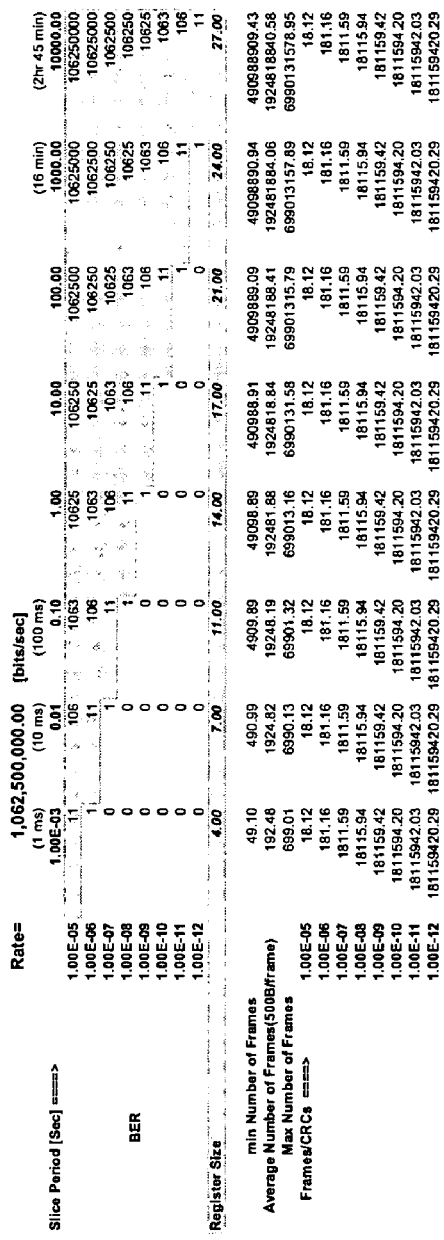

FIG. 12 illustrates exemplary calculations for a fibre channel rate of 1.0625 Gbps and the CRC error count with different BERs for various slice periods that may be utilized in connection with BER testing in a port bypass controller, in accordance with an embodiment of the invention.

Figure 13:
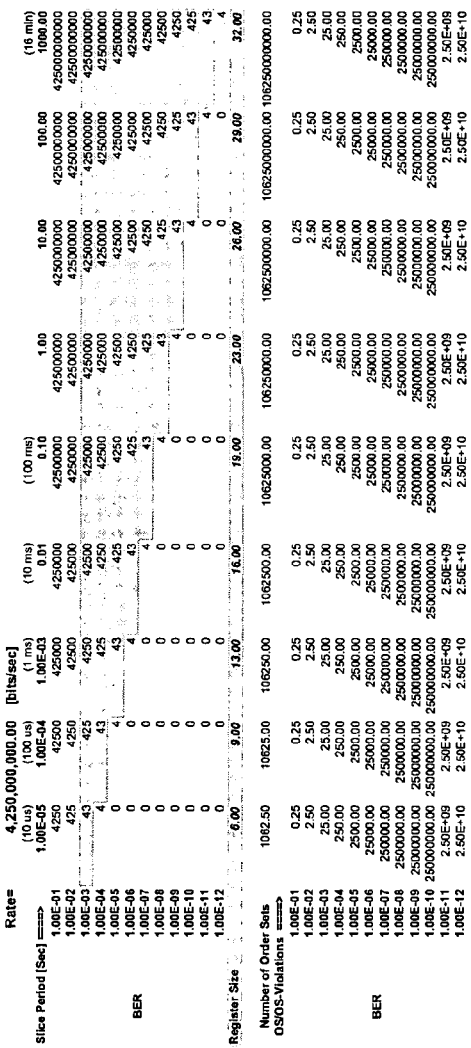

FIG. 13 illustrates exemplary calculations for a fibre channel rate of 4.25 Gbps and the ordered set error count for given BER for various slice periods that may be utilized in connection with BER testing in a port bypass controller, in accordance with an embodiment of the invention.

Figure 14:
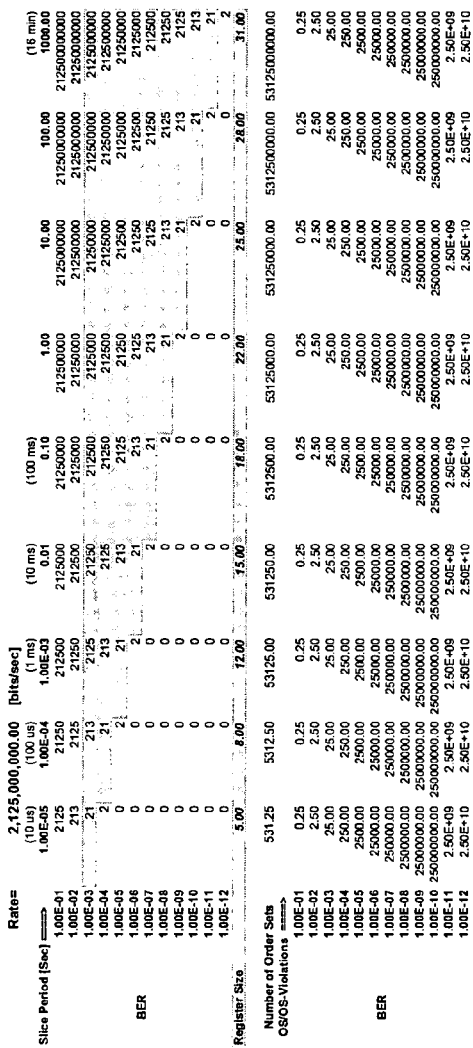

FIG. 14 illustrates exemplary calculations for a fibre channel rate of 2.125 Gbps and the ordered set error count for given BER for various slice periods that may be utilized in connection with BER testing in a port bypass controller, in accordance with an embodiment of the invention.

Figure 15:
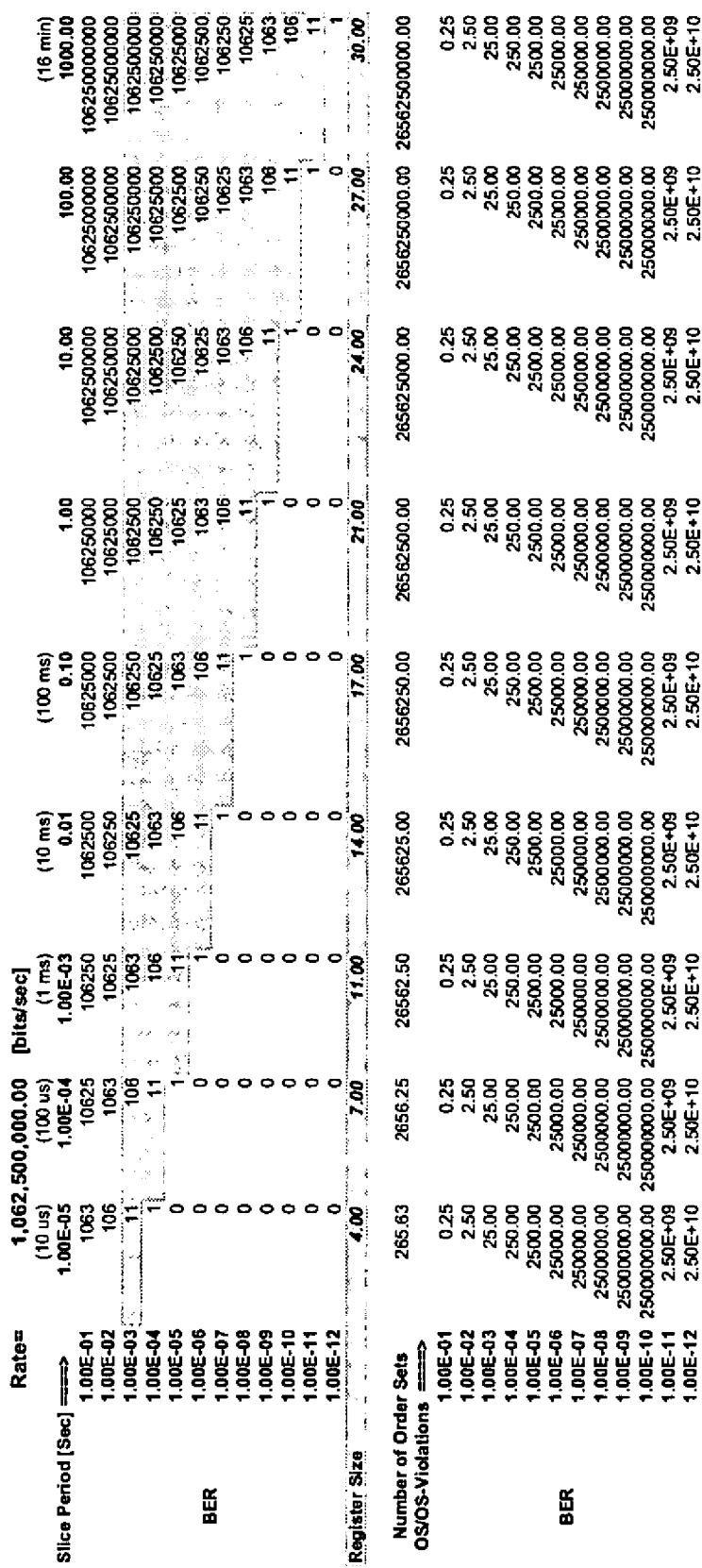

FIG. 15 illustrates exemplary calculations for a fibre channel rate of 1.0625 Gbps and the ordered set error count for given BER for various slice periods that may be utilized in connection with BER testing in a port bypass controller, in accordance with an embodiment of the invention.

Figure 16:
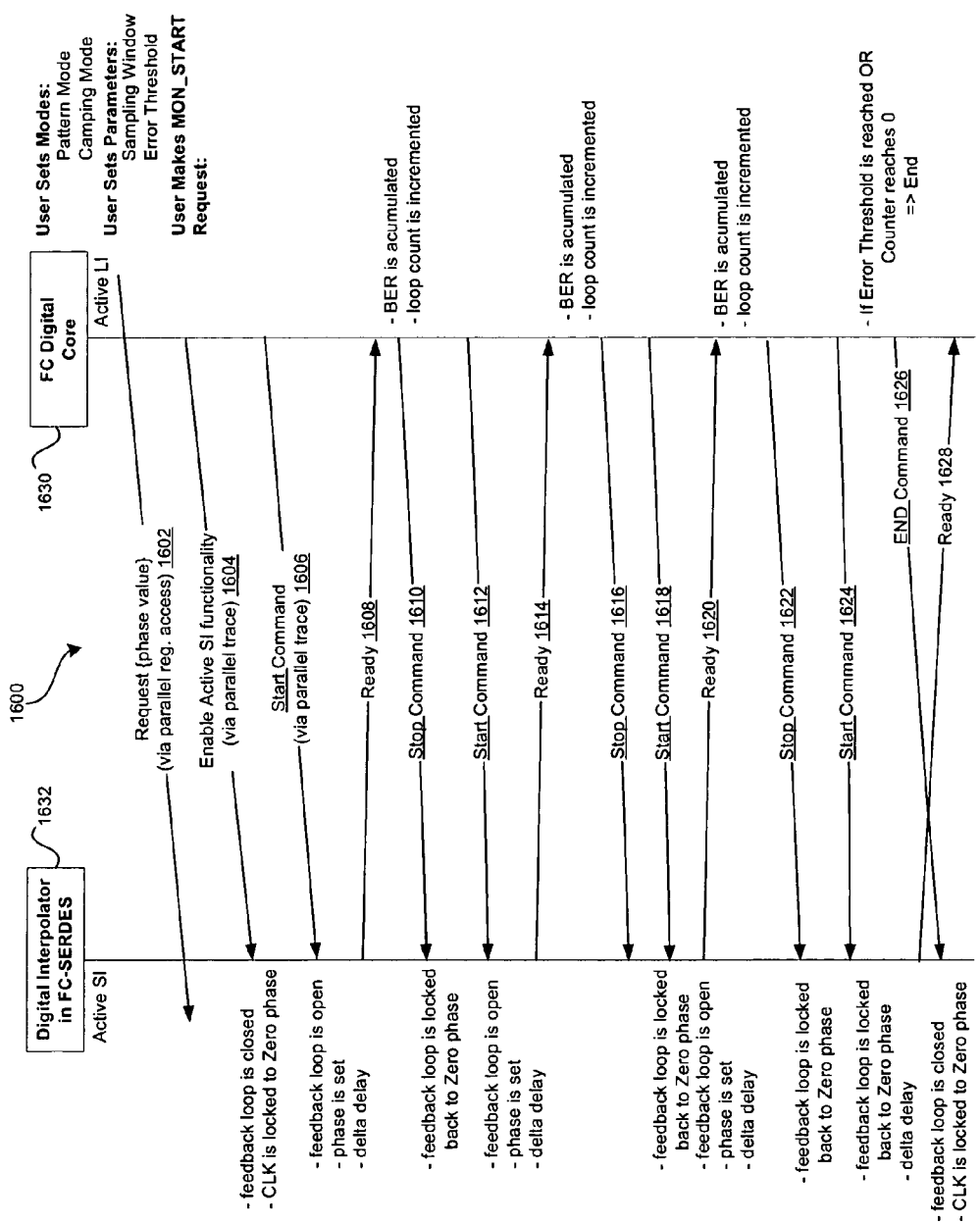

FIG. 16 is a flow diagram 1600 that illustrates an exemplary procedure that may be utilized in connection with on-chip BER estimation, in accordance with an embodiment of the invention.

Figure 17:
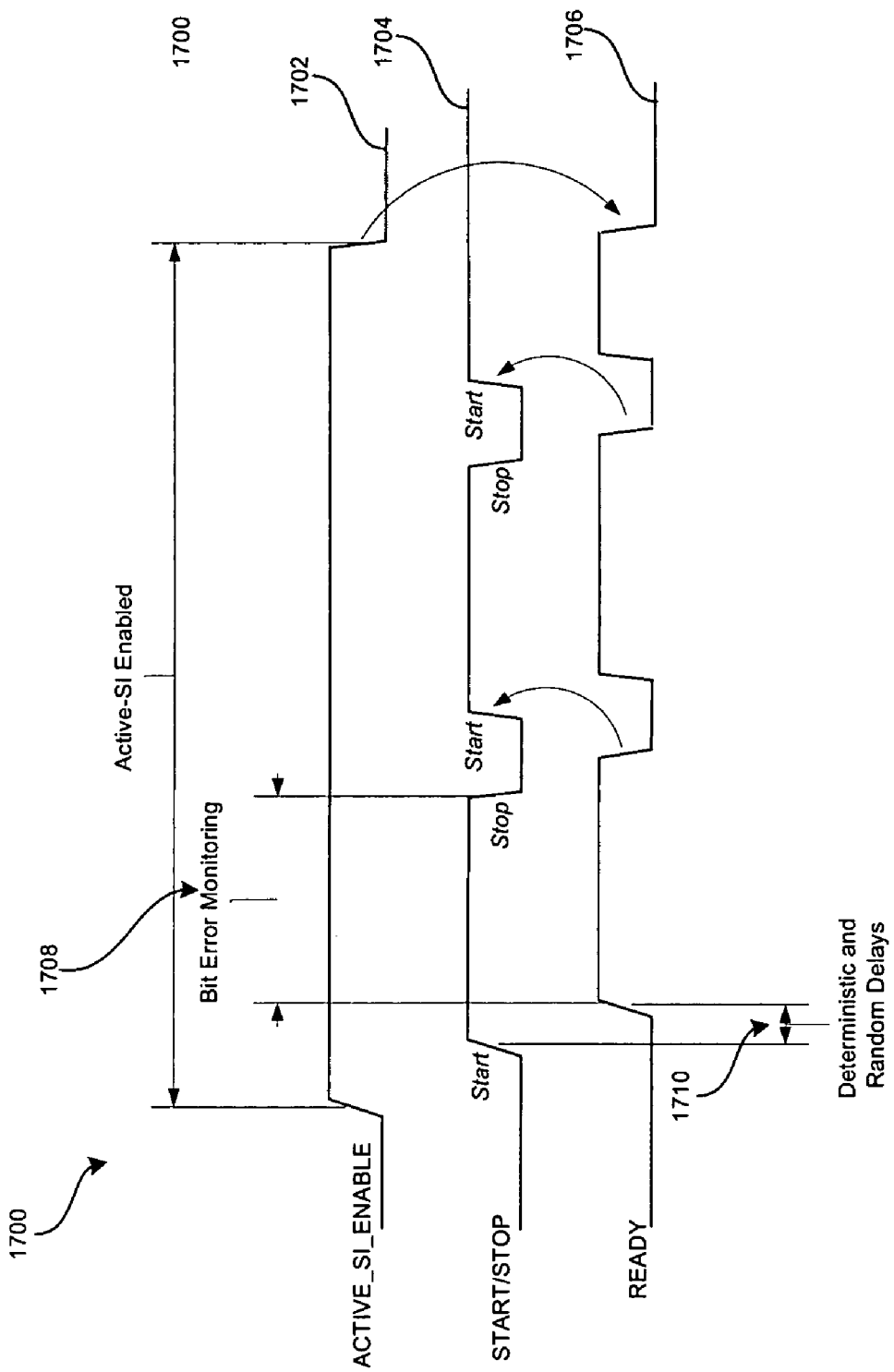

FIG. 17 is a timing diagram 1700 that may be utilized in connection with the exemplary procedure of FIG. 16 for on-chip BER estimation in a port bypass controller, in accordance with an embodiment of the invention.

Figure 18:
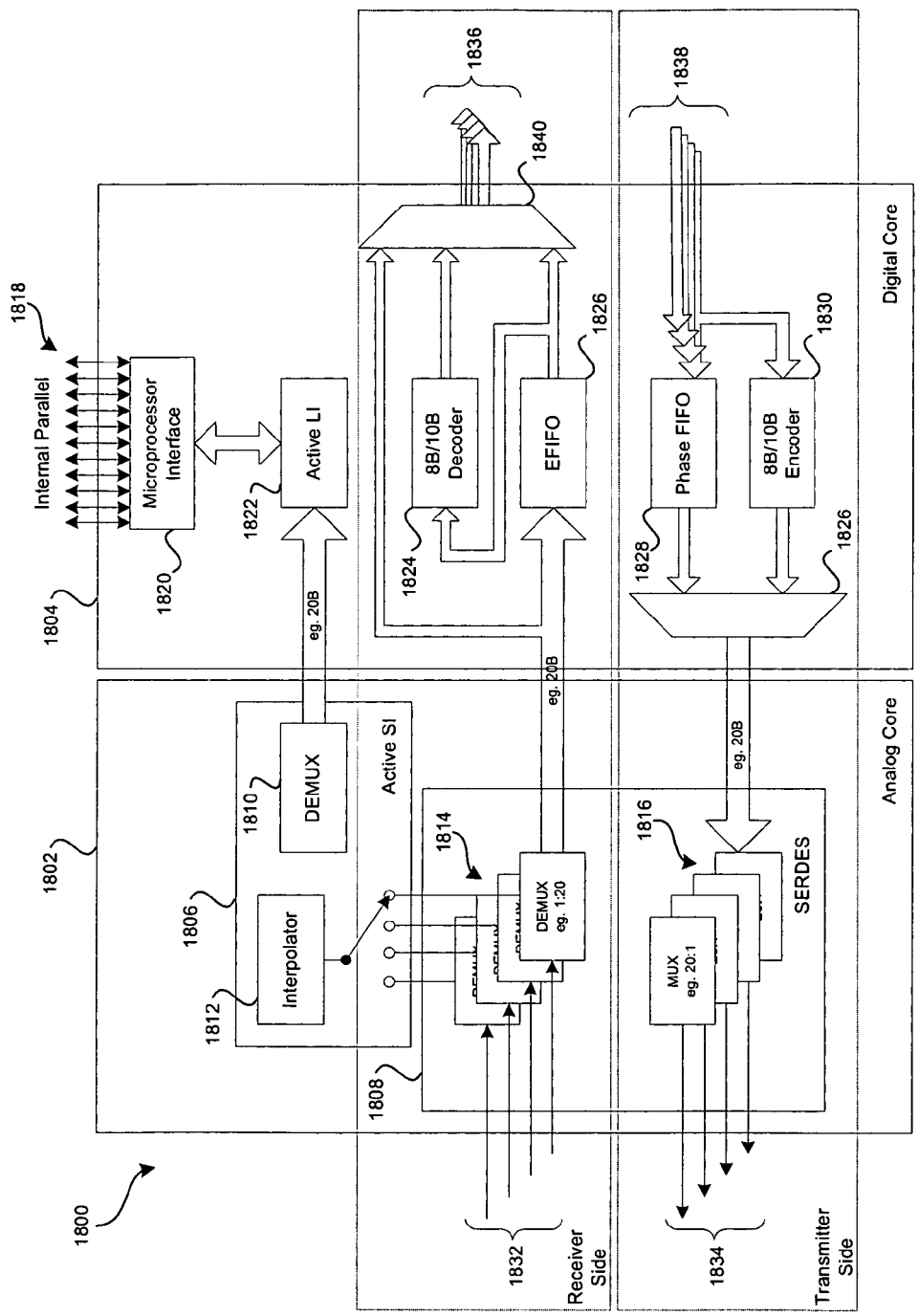

FIG. 18 is a block diagram 1800 of an exemplary architecture of a FC-Core comprising a shared auxiliary channel that may be utilized in connection with onboard BER estimation, in accordance with an embodiment of the invention.

DETAILED DESCRIPTION OF THE INVENTION

Certain embodiments of the invention may be found in a method and system for bit error rate estimation in a port bypass controller. Certain aspects of the method for bit error rate estimation in a port bypass controller may comprise receiving via a first port of the port bypass controller, a data stream comprising at least one known bit pattern. In addition to payload data, the data stream may comprise standardized stress frame patterns, a plurality of user defined transmission words and/or a plurality of ordered set sequences. The first port may lock onto at least a portion of the known bit pattern in the received data stream. A bit error rate may be generated based on a bit-by-bit comparison of at least a portion of the data stream received after the first port locks onto the known bit pattern. At least a portion of the data stream may be compared with a corresponding portion of expected data. The bit error rate may be calculated based on results from comparing at least a portion of the data stream with a corresponding portion of the expected data. The known bit pattern may be internally generated within the port bypass controller or it may be externally generated by a host system. After selecting the first port, the data stream may be transferred to the selected port of the port bypass controller.

The introduction of active signal integrity (Active-SI™) and active line integrity (Active-LI™) technology by Broadcom Corporation of Irvine, Calif., has provided various improvements with regards to reliability, availability, and serviceability (RAS) of network connections. Active signal integrity (Active-SI™) and active line integrity (Active-LI™) technology incorporates, for example, the equivalent of a bit error rate (BER) tester (BERT), an oscilloscope, and a protocol analyzer into some or all of the ports of an integrated communication device. Active-SI/LI improves system reliability, availability, and serviceability (RAS) from the chip level and may aid in, for example, system development, system integration and testing, and system deployment and startup. Accordingly, active-SI/LI provides improved time to market (TTM) and may also aid in identifying and isolating faulty system components or entities in the field. All of this translates to reduced ownership cost and significantly lower maintenance costs.

With regard to, for example, storage systems or arrays, active signal integrity (Active-SI™) and active line integrity (Active-LI™) technology may be incorporated in each fibre channel (FC) port creating a new class of intelligent port bypass controllers (PBCs) which may be referred to as intelligent bunch of disks (IBODs). IBOD devices comprise the intelligence of switches but are nonetheless, transparent to data traffic. Accordingly, this may eliminate any possible protocol interoperability problems that may arise. Each IBOD port may operate as full retiming with nominal latency of, for example, 2 to 4 fibre channel (FC) words or in repeating mode with a latency of, for example, less than one (<1) FC word. Since, IBOD devices are transparent to data traffic, any conventional or other backplane may be converted with minimal redesign effort in order to utilize active signal integrity (Active-SI™) and active line integrity (Active-LI™) for improved reliability, availability and serviceability (RAS).

Although Active-SI and Active-LI technologies may be incorporated in the exemplary port bypass controllers disclosed herein, the invention is not so limited. Accordingly, at least some of the various aspects of the method and system for bit error rate estimation in a port bypass controller may be practiced without utilizing Active-SI and Active LI technologies.

Figure 4:
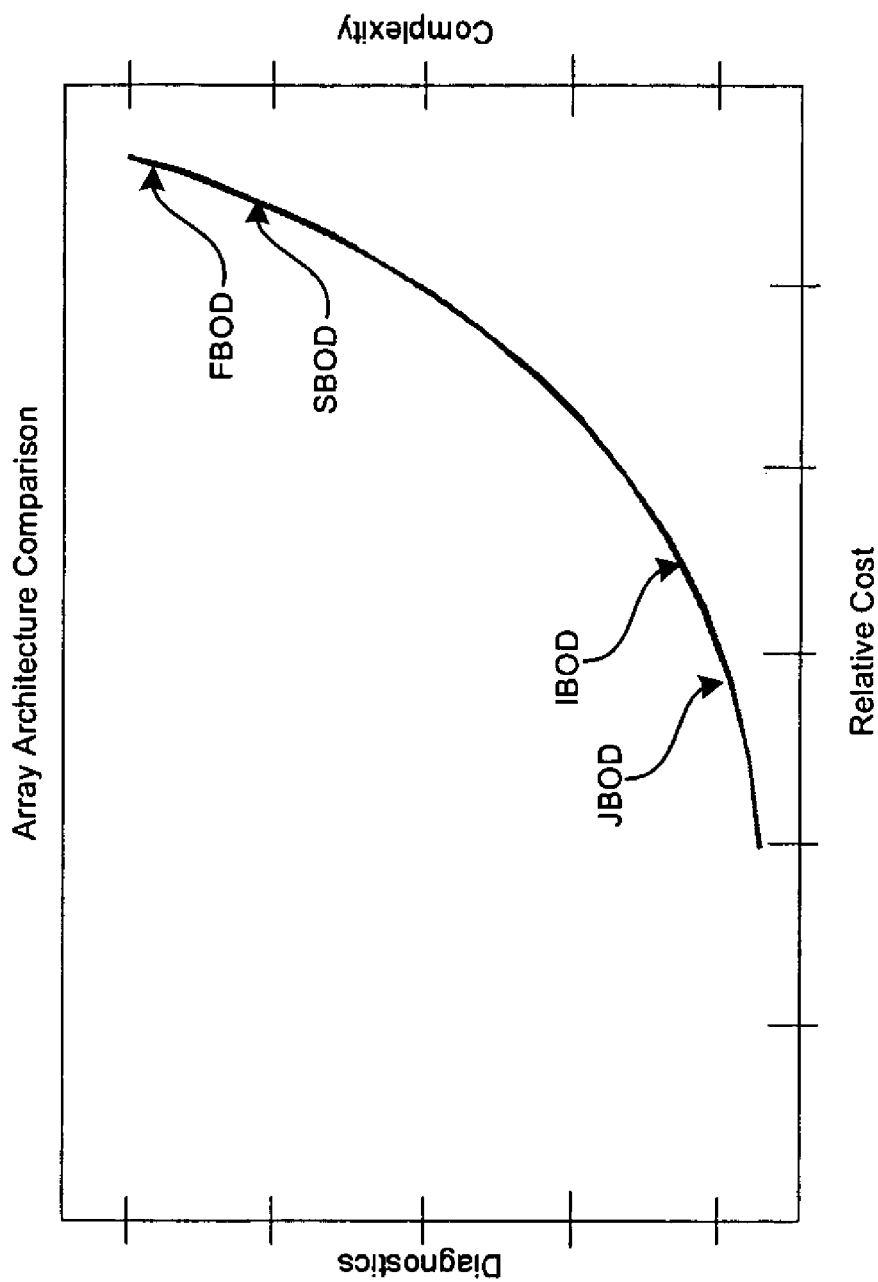
FIG. 4 is a graph illustrating a comparison of just bunch of disk (JBOD), intelligent bunch of disk (IBOD™), switched bunch of disk (SBOD), and fabric bunch of disk (FBOD™)

FIG. 4 is a graph illustrating a comparison of just bunch of disk (JBOD), intelligent bunch of disk (IBOD™), switched bunch of disk (SBOD), and fabric bunch of disk (FBOD™) technology that may be utilized in connection with onboard BER estimation in a port bypass controller, in accordance with an embodiment of the invention. Referring to FIG. 4, the left vertical axis refers to diagnostics capability, the right vertical axis refers to complexity and the horizontal axis refers to relative costs. At the lower end of the curve is JBOD, next higher is IBOD, next higher is SBOD and the highest end is FBOD. One technology driving and enabling IBODs is advanced serializer/deserializer (SerDes or SERDES) technology which incorporates Active-SI and Active-LI. Although FBOD and SBOD have the highest relative cost and greatest complexity, hybrid implementations of IBOD and FBOD may be provided which offer improved scaling and performance with cost on par with SBOD.

FIG. 5 is a block diagram illustrating an exemplary Active-SI/LI SERDES that may be utilized in connection with bit error rate estimation in a port bypass controller, in accordance with an embodiment of the invention. Active-SI/LI SERDES is adapted to transparently monitor incoming signal quality, such as FC0, FC1, and some FC2 functions at the chip level, without disturbing the signal. The SERDES may be incorporated into port bypass controllers and switches.

Due to the fact that a majority of storage array failures have traditionally been related to signal integrity, monitoring signal integrity and quality (SI) may be the most direct method for diagnosing the root cause of these failures. Although some signal integrity (SI) problems may eventually be elevated to the transport layer and be detected by FC1 or FC2 layer by utilizing conventional managed PBC or a loop switch (LS), some signal integrity problems go undetected at the transport layer or may never be elevated to the transport layer. Active-SI/LI SERDES may be utilized to further monitor signal quality degradation which may not be visible to a loop switch until a catastrophic failure occurs.

With regard to Active-SI/LI performance monitoring (PB), Active-SI may monitor the incoming signal quality and integrity and Active-LI may further enhance active-SI by monitoring the transport layer and providing estimates of the bit error rate of the link. Active-SI/LI SERDES may be integrated on-chip to create IBOD and FBOD arrays, which may provide various key features and benefits such as variable signal detection. Variable signal detection may permit a plurality of programmable levels to be defined, which may be utilized for determining input signal amplitude. In this regard, variable signal detection may allow programming of, for example, eight (8) possible discrimination levels which may be utilized to determine an amplitude of an input signal. An eye margin may be calculated for some or all of the input ports and an associated bit error rate may be calculated for each port based on a bit by bit comparison. To determine system margin, the input port may be programmed with an offset to emulate, for example, suboptimal or degraded channel conditions. Whenever the threshold is reached, one or more alarms may be generated in order to report the alarm. Eye margin is a powerful tool that may be utilized to isolate conditions including, but not limited to, signal integrity issues such as excess reflection, excess noise coupling, connector issues, capacitor cracking, excess loss, and excess upstream jitter. Accordingly, by varying the threshold or discrimination level, any one or more of these conditions may be detected on a particular port.

Figure 1A:
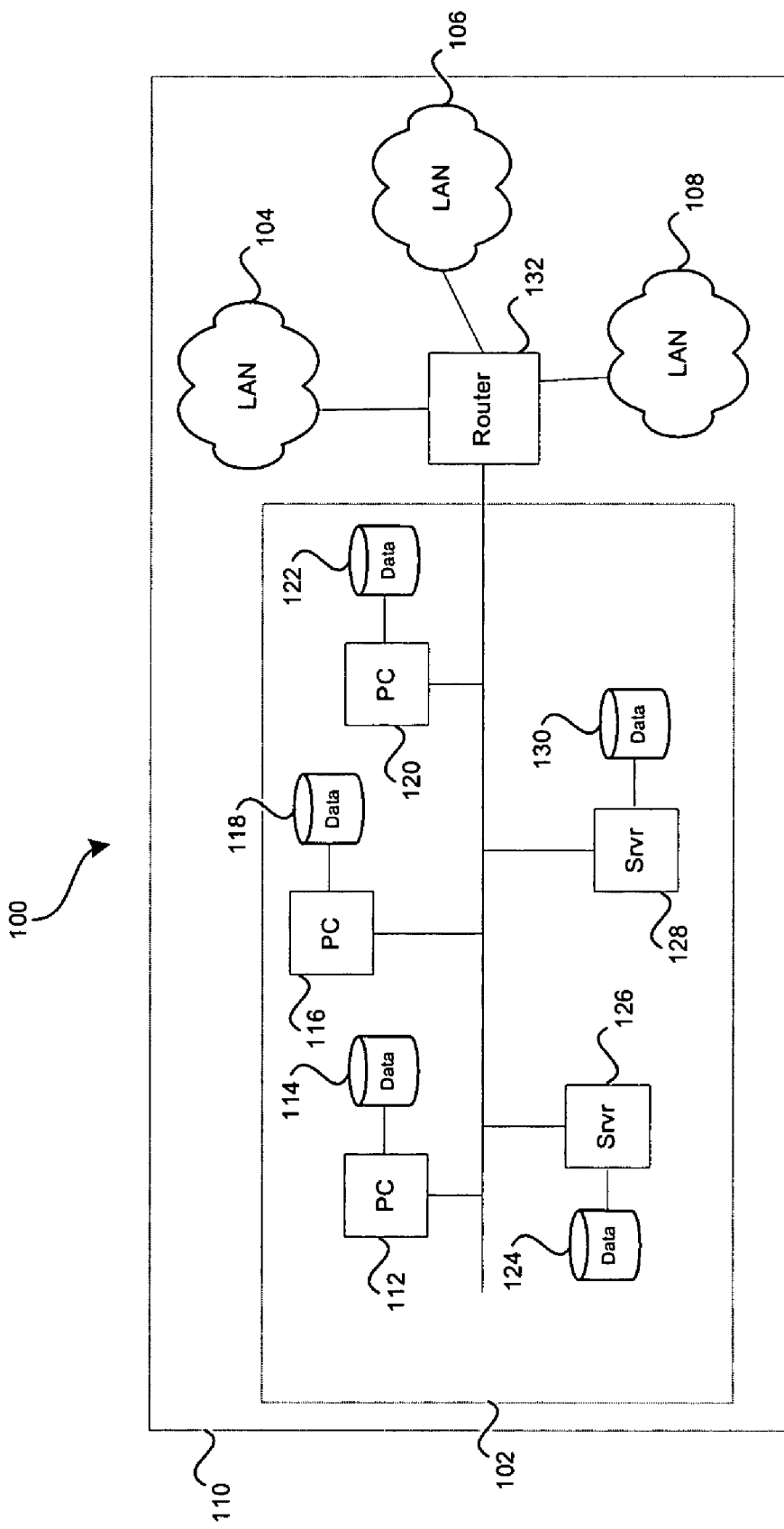
FIG. 1a is a block diagram of a conventional networking environment illustrating the arrangements of various communication and storage entities.
Figure 1B:
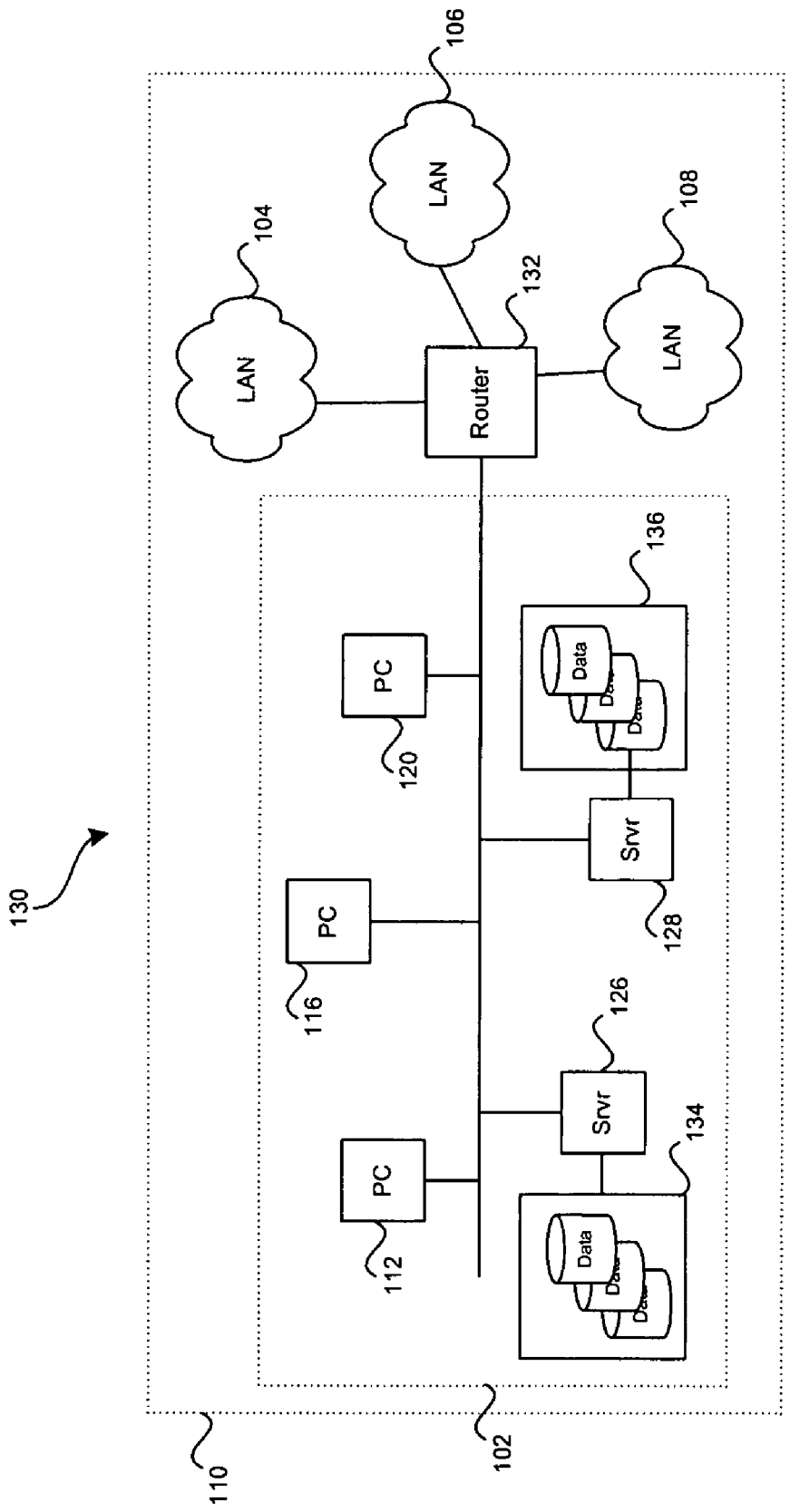
Figure 1C:
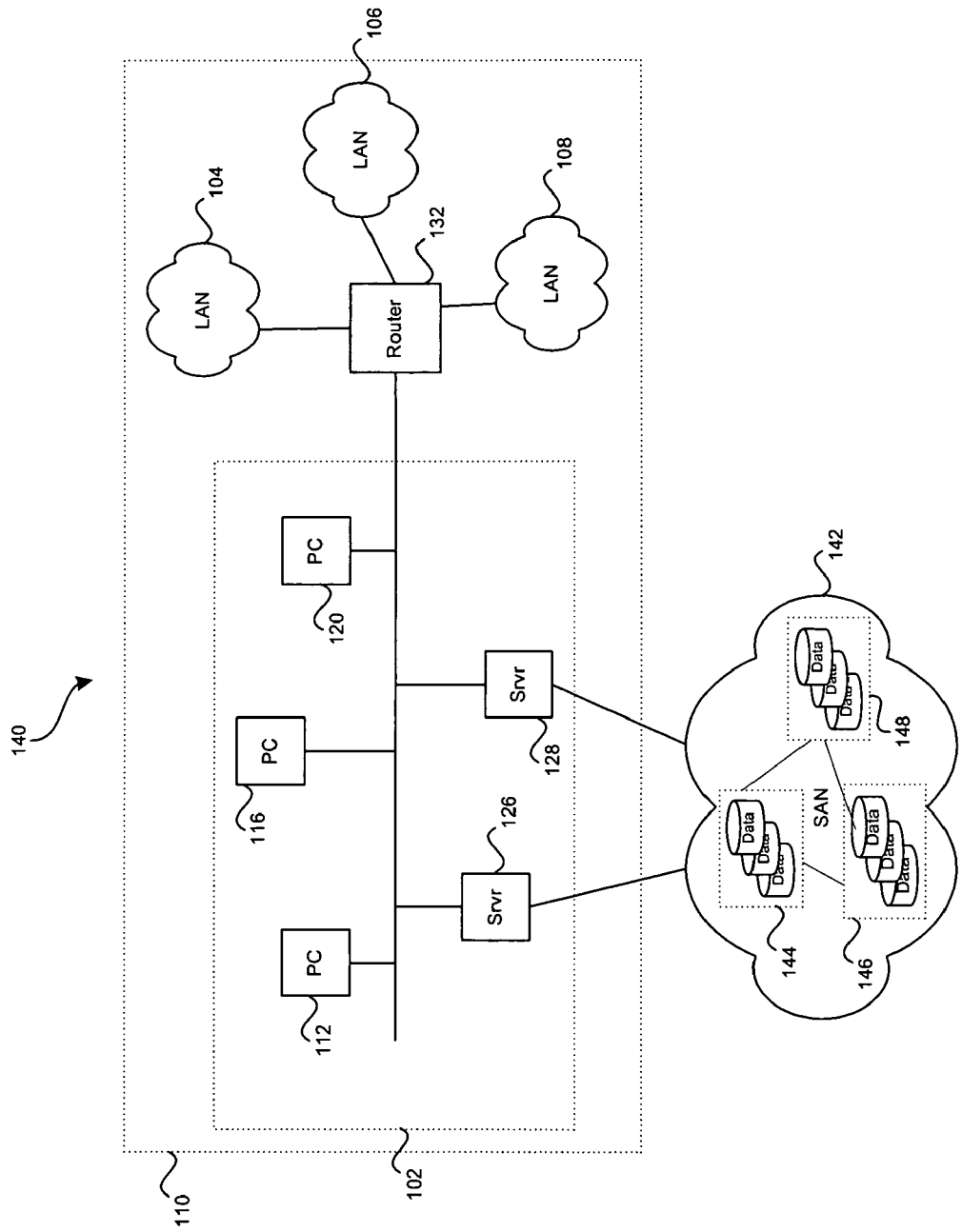
FIG. 1c is a block diagram of an improved conventional networking environment illustrating the arrangements of various communication and storage entities, which addresses some of the drawbacks of the networking environment of FIG. 1a and FIG. 1b.
Figure 2:
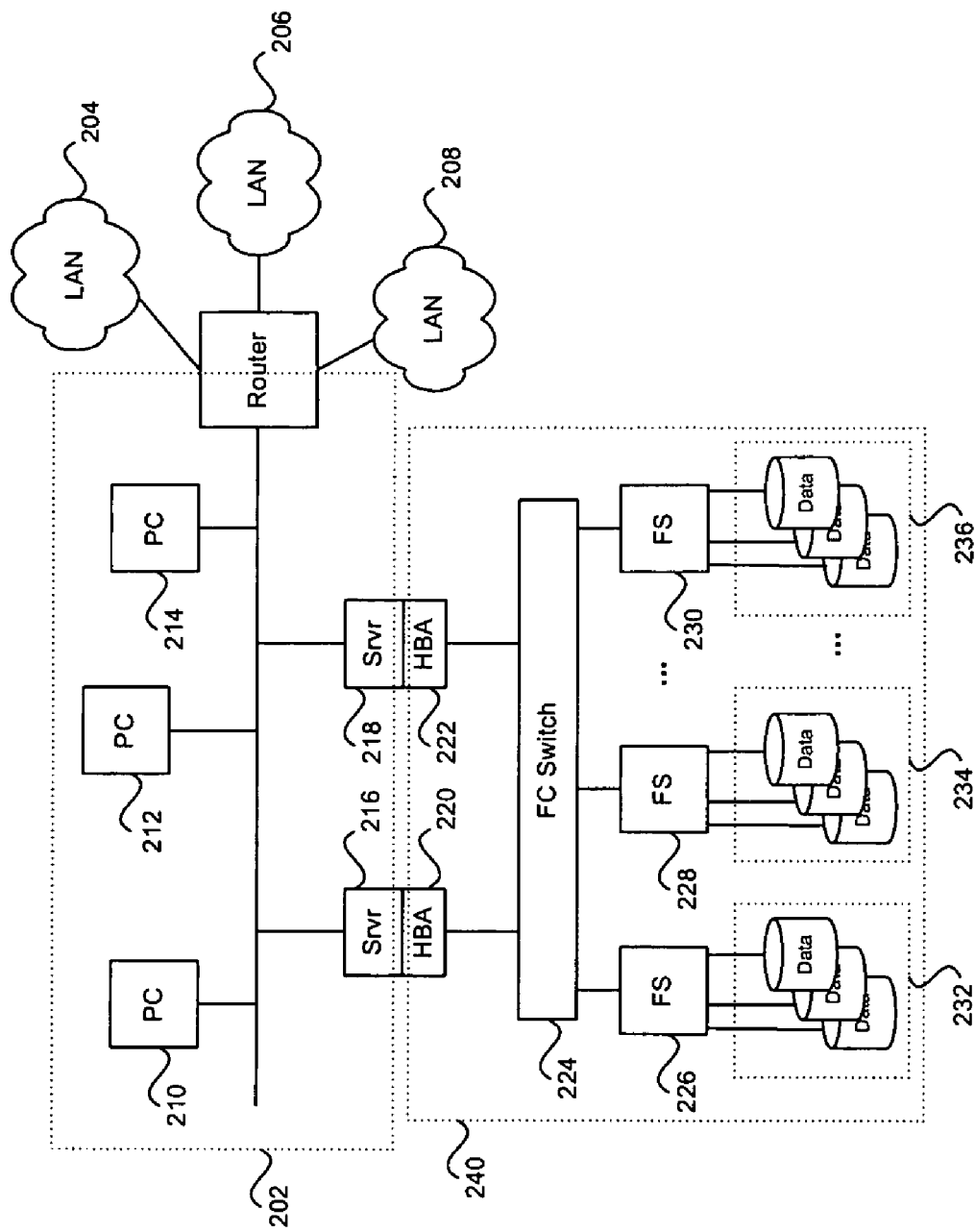
FIG. 2 is a block diagram of an exemplary local area network (LAN) coupled to a storage area network (SAN).
Figure 3:
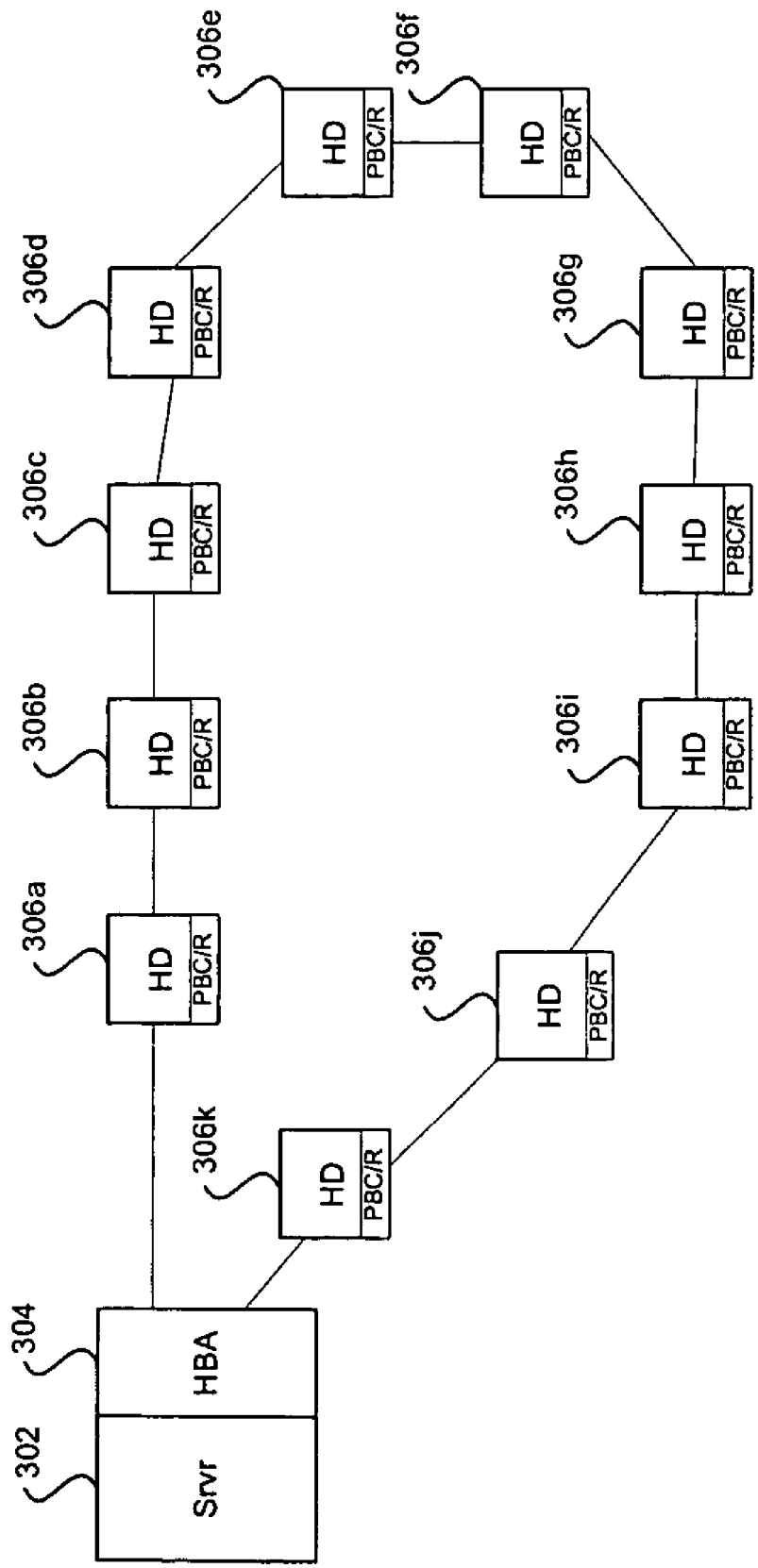
FIG. 3 is a block diagram of a conventional fibre channel arbitrated loop arrangement which may be utilized for coupling a plurality of hard disks which may be found in the data storage entities of FIG. 1a, FIG. 1b, FIG. 1c and FIG. 2.

FIG. 6 is a graph illustrating three links, that may be may be utilized in connection with onboard bit error rate estimation in a port bypass controller, in accordance with an embodiment of the invention. Referring to FIG. 6, each of the illustrated links of FIG. 1c meets a bit error rate estimation of 1E-12 requirement. Case 1 may be typical of an optical link and case 2 may be typical of a copper link. The eye margin test may measure the eye opening typically at a bit error rate of 1E-5 to 1E-8 in order to minimize the test time and this may be extrapolated to 1E-12 with a base line understanding. During the development phase, for example, a baseline pass or fail criteria may be established, which may allow monitoring of a device, for example, one located in the field, for signal degradation. A newly added component which does not meet operating specifications or may otherwise be incompatible with other components or entities, may be more readily diagnosed and detected.

With regard to frequency offset and drift, some or all of the port frequencies may be monitored against an IBOD reference oscillator frequency. Each disk drive may have it own clock source with, for example, a ±100 ppm tolerance. An alarm may be set if the target and IBOD reference frequency exceeds ±200 ppm. If it is determined that several of the reference frequencies of the target devices are drifting, then it may safely be assumed that the IBOD clock may also be drifting.

An 8B10B word error counter may also be provided for assessing errors. Accordingly, 8B/10B words error may be continuously monitored on each link for violation and word errors may be tracked by utilizing one or more counters to keep a running count of the word errors. Frame CRC error may also be continuously monitored on each input with CRC errors counted. Since, CRC error may be monitored on each port, the source of a failing drive and its associated arbitrated loop physical address (ALPA) may be determined.

Traffic monitoring may also be done on a port by port basis. In this regard, the traffic on each port as a percentage of the frame may be monitored to help show a status and health of the IBOD paths to the hard drives and a host system. Traffic flow may also be monitored for ordered set, idle, and the transmitted frames.

For bit error rate monitoring, active-LI may provide, for example, a bit by bit comparison which may be utilized to determine an actual serial error rate, as opposed to cyclic redundancy check (CRC) which only indicates a frame in error. In the latter case, the frame in error may comprise a single error or multiple errors which is not distinguished by the CRC. However, in accordance with an embodiment of the invention, the link may be monitored during start up and during operation for idle, LIP, and other ordered set so as to determine a bit error rate. If bit error rate monitoring is combined with the accelerated eye margin test from active signal integrity, then it may be possible to may drive in about 100's μs in the link bit error rate and eye opening. In addition to bit error rate monitoring on the ordered set, frames with a repeated word data payload may be monitored and counted for errors.

For frame bit error rate monitoring, active line integrity may also provide a bit by bit comparison which may be utilized to determine an actual serial error rate, as opposed to a cyclic redundancy check which only indicates a frame in error which may include one or multiple errors. During link start up, idle and LIP word transmission may be monitored to establish a bit error rate on the link. When bit error rate monitoring is combined with the accelerated eye margin test from active signal integrity, then one may drive about 100's μs in the link BER and eye opening.

Products utilizing or based on Active-SI/LI technology enable a heightened new level of availability meeting today's requirement of 24×7×365 availability. Early detection of problems and/or errors provided by Active SI and active LI may further enhance RAS and cost of ownership. Since Active-SI/LI technology is incorporated into the FC core, it may be utilized for any product operating at 1, 2, or 4 GFC, for example. The benefit of fault detection and signal quality monitoring applies to disk drives behind RAID or NAS controllers and to Optical or copper links connecting the arrays.

The following table illustrates a plurality of common fibre channel storage arrays failures and how each associated failure is handled by JBOD, SBOD and IBOD. As illustrated, traditional JBOD gave almost no diagnostic capability while SBOD addresses fibre channel transport issues at the expense of cost and complexity. Finally, IBOD provides greater diagnostablity with lower complexity and cost.

Today high performance drives have MTBF of greater than 1 million hours, but with increased temperature and a greater number of hard drives that are coupled together, the failure may escalate. Hard drive failures may occur due to media failure and/or data transport and connector problems. A media failure makes access to all data unavailable, but a transport or connector failure may only prevent access to the hard drive. Transport failures and connector failures often occur gradually before there is a catastrophic failure. Sometimes warning signs may be detectable weeks before the hard failures occur. During this period, the data may be safely transferred and the failing component replaced. To improve availability, all FC drives are dual loop devices, but a failing connector is a single point of failure for both loops. Active-SI provides a solution for detecting gradual degradation.

Active signal integrity and active line integrity provides integrated affordable instrument like signal quality monitor-

| Failure Mechanism | JBOD | SBOD | IBOD |
| --- | --- | --- | --- |
| Loss of Sync Such as CDR Locking to 7E | Detect by Loss of Lock Only on Retimed Port | Detect by Loss of Lock | Detect by Loss of Lock |
| Jitter Accumulation | No Detection | No Detection only Catastrophic Failures | Detect by Active-SI |
| Laser Degradation | No Detection | No Detection only Catastrophic Failures | Detect by Active-SI |
| Copper Cable | No Detection | Catastrophic Failures | Detect by Active-SI |
| Differential Skew | No Detection | Catastrophic Failures | Detect by Active-SI |
| Excess Noise | No Detection | No Detection only Catastrophic Failures | Detect by Active-SI |
| Reflection and Return Loss Problems | No Detection | No Detection only Catastrophic Failures | Detect by Loss of Lock |
| Upstream Device Continuously Sends Lipf8 | No Detection | Detect | Detect by Active-LI |
| Upstream Device Can't Initialize Continuously send Idle | No Detection | Detect | Detect by Active-LI |
| CRC Framing Errors | No Detection | Detect | Detect by Active-LI |

Three of the most common factors contributing to the failure of storage systems include degradation of lasers, degradation of cables, and degradation of hard disks or drives. Like most optical components, lasers also have a limited lifespan and typically degrade due to relaxation oscillation (RO). However, with advancements such as the introduction of vertical cavity surface emitting lasers, (VCSELs), the mean time between failure (MTBF) has dramatically improved. Even with improved process, over a period of 5-7 years of product life, the percent may be high. These failures start with a gradual in signal degradation and increased jitter, which may be detected with Active-SI.

Unlike optical links, copper links have no inherent wear out mechanism. Copper links may degrade as a result of their weight, mechanical movement or exposure to the elements. The early onset of degradation often results in signal degradation causing a increased jitter, which can be detected with Active-SI. Copper can also behave intermittently, making fault isolation very difficult.

Hard drives are complex mechanical devices and are typically less reliable than solid state devices due to the number of moving parts which are more prone to degradation over time.

ing with protocol analyzer intelligence into every fibre channel port. In, for example, SONET, network instruments are often integrated in to the network infrastructure at cost in excess of $100K's, which are un-practical for storage systems. Active-SI/LI technology has raised the bar on RAS with a goal of reducing total cost of ownership from development to service. Never before has this level of diagnostics and serviceability anytime, anyplace, and anywhere been available prior to introduction of Active-SI/LI. IBOD provides superior diagnostics and management without extra complication associated with a loop switch and as a result, it is no longer necessary to use a loop switch just to have diagnostics capability. A switch should be used when you have devices with mixed speed, large loop, or multiple initiators. Hybrid FBOD/IBOD implementations with the switch located either in the array or external to the array may provide superior performance and availability to SBODs.

An aspect of the invention may be found in an active line integrity (LI) implementation in a fibre channel core (FC-Core) and devices such as BCM8412, BCM8414 and BCM8424 developed by Broadcom Corporation of Irvine Calif. The active line integrity (LI) implementation in a fibre channel core (FC-Core) may comprise monitoring modes, active LI metrics, and a shared AUX channel. A plurality of monitoring modes may be provided and may comprise initialization mode and normal mode.

In the initialization monitoring mode, a device under test (DUT) may send, for example, about 600 data words in fibre channel (FC) frames. A data payload of each FC-frame may contain a long sequence 40-bit pattern, for example. This 40-bit pattern may be a predefined and valid 8B/10B pattern, which may be stored in an Active LI register. A host may be programmed to create FC frames with a particular pattern in its payload. A hard disk drive (HDD) under test may be configured to repeat the frame and send it towards the device, which will run LI testing. The percentage of known patterns with respect to the total number of words may be greater than 90% or 95%. Accordingly, idles, CRCs, FC-Headers and/or ordered sets words may be added. The known pattern in the data-payload may represent a significant majority. Active LI will use 33 error-accumulation counter registers for initialization monitoring mode. Using an analog phase interpolator, the eye pattern may comprise 16 camping points to the right and 16 camping points to the left from the center of the eye. Other numbers of camping points may also be utilized.

With regard to the initialization monitoring mode, the active line integrity the initialization monitoring mode may bypass the 8B/10B decoder functionality. It will search for the 40-bit pattern and lock on it and accordingly, record the number of errors found in these patterns for the total length of the camping period for each eye-closure slice. In normal monitoring mode, for each port, active signal integrity will camp in a different slice of the eye pattern using the phase interpolator and during this period, the active signal integrity may analyze the signal stream for errors. The error-accumulator counter register associated with each slice may be updated during this period.

There may be two general activity levels in the fibre channel, which may include a data transfer level and an idle/control level. Camping in a slice of the eye pattern phase shift may occur for short periods. Accordingly, the activity in the fibre channel may be characterized by either mostly data transfer or mostly idle/control transfer. In the data transfer activity level mode, the most accurate information may be provided by the CRC counter for low BERs. When the error increases significantly, the CRC may fail to provide a reasonable approximation and the ordered set violation detection may start to pick up errors. The ordered set violation detection may not be very reliable until the BER is relatively high. Therefore, there may be a gap that must be compensated for by using the error accumulation information obtained during idle/ctrl activity level periods.

In the idle/control transfer activity level mode, the most accurate information may be provided by the detection counter. When the error increases significantly the ordered set violation will continue to provide a reasonable approximation. In normal operation, the error-accumulation errors may be read for all slices, but the type of activity level of the line may remain unknown during the monitoring period. Accordingly, various samples may be utilized, and an algorithm may be utilized to approximate the BER errors for the different phase-change slices. Active LI may utilize a plurality of main error counters including, for example, 8B/10B code violation counter, CRC error counter, and ordered set violation error-accumulator counter registers.

In the normal monitoring mode, active line integrity may be adapted to utilize the 8B/10B decoder and count the number of 8B/10B code violations for every slice. The number of errors found in the CRC for each frame and the number of ordered set violations for the whole camping period may be recorded. If the number of error exceeds a threshold for a particular slice, the active SI may generate an alarm which may indicate the associated slice number such as −16, −15, . . . , 0, . . . , 15, 16. This may be a part of a ranging process.

With regard to active line integrity metrics, there may be a plurality of error-accumulator counter registers which may be associated with each phase slice. Exemplary error-accumulator counter registers may comprise 8B/10B running disparity error, CRC and ordered set violation registers. Error calculation may be based on the assumption that the errors are random and follow, for example, a Poisson distribution. An 8B/10B running disparity error counter may be accumulated in an error-accumulator counter register. The 8B/10B running disparity error counter value may be utilized as a possible metric to estimate the bit error rate. However, the 8B/10B running disparity error counter may be used as a warning mechanism rather than an estimation engine. With regards to a CRC error counter, a phase-camping slice may be camping during a data-transfer time, an idle/ctrl transfer time and a mixture-transition time. A CRC error counter may be utilized when frames are being transmitted.

When frames are being transmitted, the CRC have a limitation in its accuracy when estimating the bit error rate. A worst case scenario may occur when all frames are at their maximum size of 2112 bytes of payload each and this will be the highest limitation for the CRC as an estimation parameter. In this case, the CRC may be utilized to estimate bit error rates of $10^{-6}$ or lower. If, for example, all the frames have an average of about 500 bytes in the payload then the CRC may be utilized to estimate bit error rates of $10^{-5}$ or lower. These last two cases can be seen in the tables shown below.

FIG. 7 illustrates exemplary calculations for a fibre channel rate of 4.25 Gbps and the CRC error count with different bit error rates for various slice periods that may be utilized in connection with BER testing in a port bypass controller, in accordance with an embodiment of the invention. The upper portion of FIG. 7 shows an estimation of the number of CRC errors detected in a given period based on a phase-variation point from the center of the eye and corresponding various BER values. In the center of FIG. 7, the maximum length in bits of the counter required for the accompanying slice period (column) without causing saturation is illustrated in the middle row.

The lower portion of FIG. 7 shows the ratio between transmitted frames and the required number of CRC error count to obtain the desired bit error rates. In this regard, all columns basically have identical values. FIG. 7 utilizes the worst-case scenario to estimate slice-periods and measurable BERs, which are illustrated in the shaded area. The shaded area also shows a set of measurable ranges for the CRC. Because the variable size of the frame associated to the CRC, BERs greater than $10^{-6}$ are not reliably measurable with this parameter. However, the invention is not so limited and with other variable sizes, bit error rates greater than $10^{-6}$ may be reliably measured.

With regard to FIG. 7, during heavy data-transfer activity level, packets may be continuously sent with, for example, one SOF, one EOF, and 3 idles or ordered sets. The total number of idles, SOF, per EOF in between sent frames are approximately 24 bytes and the data payload size goes from about 100 bytes to 2112 bytes. The errors may be evenly distributed over time. Since the CRC is associated with a frame of size 28+X (bytes), where X=[100,2112], it may be assumed that only one bit is in error at most per frame. Therefore, BER of $10^{-6}$ are not measurable using the CRC.

The device may camp in each phase-shift position or sampling position with respect to the center of the eye for a period T=10 ms, 100 ms, ..., 2 hr 45 min.

FIG. 8 illustrates exemplary calculations for a fibre channel rate of 2.125 and the CRC error count with different BERs for various slice periods that may be utilized in connection with BER testing in a port bypass controller, in accordance with an embodiment of the invention. Similar to FIG. 7, FIG. 8 utilizes the worst-case scenario to estimate slice-periods and measurable BERs which are illustrated in the shaded area.

FIG. 9 illustrates exemplary calculations for a fibre channel rate of 1.0625 Gbps and the CRC error count with different BERs for various slice periods that may be utilized in connection with BER testing in a port bypass controller, in accordance with an embodiment of the invention. Similar to FIG. 7, FIG. 9 utilizes the worst-case scenario to estimate slice-periods and measurable BERs as illustrated in the shaded area. If the BER estimations are based solely on the CRC values, for worse-case scenarios, then the estimator may be limited to BERs of the order of about $10^{-6}$ or lower. Slice periods may also be limited to about 10 msec as a lower bound. Furthermore, for slice period of 100 msec, then the counter size may be 10 bits, and for a slice period of about 1 sec, then the counter size would be about 14 bits.

FIG. 10 illustrates exemplary calculations for a fibre channel rate of 4.25 Gbps and the CRC error count with different BERs for various slice periods that may be utilized in connection with BER testing in a port bypass controller, in accordance with an embodiment of the invention. FIG. 10 utilizes the worst-case scenario to estimate slice-periods and measurable BERs as illustrated in the shaded area. An average frame size of about 500 bytes of data payload is utilized.

FIG. 11 illustrates exemplary calculations for a fibre channel rate of 2.125 Gbps and the CRC error count with different BERs for various slice periods that may be utilized in connection with BER testing in a port bypass controller, in accordance with an embodiment of the invention. FIG. 11 utilizes the worst-case scenario to estimate slice-periods and measurable BERs as illustrated in the shaded area. An average frame size of about 500 bytes of data payload is utilized.

FIG. 12 illustrates exemplary calculations for a fibre channel rate of 1.0625 Gbps and the CRC error count with different BERs for various slice periods that may be utilized in connection with BER testing in a port bypass controller, in accordance with an embodiment of the invention. FIG. 12 utilizes the worst-case scenario to estimate slice periods and measurable BERs as illustrated in the shaded area. An average frame size of about 500 bytes of data payload is utilized.

With reference to FIGS. 10-12, if BER estimations were based solely on the CRC values and for an average frame size, then the estimator may be limited to BERs of about $10^{-5}$ or lower, and slice periods may have a lower bound of about 1 ms. For a slice period of about 100 msec, then the counter size may be 14 bits and for the longest slice period of about 1 sec, then the counter size may be about 16 bits.

With regard to an ordered set violation counter, a phase-camping slice may occur during a mixture transition time including some data-transfer times and some idle/ctrl transfer times. The ordered set violation error counter may be utilized when no frames and only idles or order-sets are being transmitted.

FIG. 13 illustrates exemplary calculations for a fibre channel rate of 4.25 Gbps and the ordered set error count for given BER for various slice periods that may be utilized in connection with BER testing in a port bypass controller, in accordance with an embodiment of the invention. Referring to FIG. 13, the upper portion of this figure shows an estimation of the number of ordered set violation errors based on the phase-variation point from the center of the eye which are detected in a given period and which are utilized to obtain various bit error rate values. In the middle portion of FIG. 13, there is shown a row that depicts the maximum length in bits of a counter that may be required for a corresponding slice period shown in the associated column without causing saturation. The lower portion of FIG. 13 shows the ratio between transmitted ordered sets and the required number of ordered set violation error count to obtain the desired bit error rates. In this regard, all columns are identical in value. The shaded area illustrates the set of measurable ranges for ordered set violations. Due to the variable size of the 4-word width associated with the ordered sets, BERs greater than $10^{-3}$ may not be reliably measured with this parameter. Notwithstanding, the invention is so limited and with a large word size, bit error rates greater than $10^{-3}$ may be reliably measured.

FIG. 14 illustrates exemplary calculations for a fibre channel rate of 2.125 Gbps and the ordered set error count for given BER for various slice periods that may be utilized in connection with BER testing in a port bypass controller, in accordance with an embodiment of the invention.

FIG. 15 illustrates exemplary calculations for a fibre channel rate of 1.0625 Gbps and the ordered set error count for given BER for various slice periods that may be utilized in connection with BER testing in a port bypass controller, in accordance with an embodiment of the invention.

With regard to these exemplary calculations, in cases where the BER estimations may be based solely on the ordered set violation, the bit error rate estimations may be limited to bit error rates of about $10^{-3}$ or lower. Slice periods may also be limited to about 10 microseconds (μs) as a lower bound. For the longest slice period of about 100 msec (ms), the counter size may be 20 bits and for a 1 sec lower bound the counter size would be about 24 bits. Notwithstanding, the invention is not limited in this regard and lower bit error rates may be calculated. For example, in order to calculate lower BERs, counter values for several periods may be accumulated and the accumulate results may be divided by the sum of all these time periods.

Since it may be feasible to find initialization conditions where there are no frames and only ordered sets then one embodiment of the invention may utilize a plurality o of slice periods. For example, five (5) slice periods may be utilize and may include 10 μsec, 100 μsec, 1 msec, 10 msec, 100 msec. A sixth slice period such as a one (1) slice period may also be utilized. A 20-bit counter may be utilized for each fibre channel for up to 100 msec slice period or a 24 bit counter may be utilized for each fibre channel for up to 1 sec slice period. BERs estimation from $10^{-3}$ to $10^{-8}$ may be done with a single slice period. For lower BERs, counter values for several periods may be externally accumulated and the results divided by the sum of all the accumulated time periods. However, during active non-intrusive monitoring activities, the instantaneous operation may be in either activity level or a mixture of the two. An approximation that may be utilized to estimate the BER may be based on the sum of the CRC errors and the ordered set (OS) violations.

FIG. 16 is a flow diagram 1600 that illustrates an exemplary procedure that may be utilized in connection with on-chip BER estimation, in accordance with an embodiment of the invention. Referring to FIG. 16, there is shown a digital fibre channel core block 1630 and a digital interpolator in a fibre channel SERDES block 1632. Initially, a user or program may be set to operate in a pattern mode or a camping mode of operation. Parameters such as a sampling window and an error threshold may be may be set. A request to start monitoring may be initiated using, for example, a MON_START request. In step 1602, a request including, for example, a phase value may be communicated from the FC digital core 1630 to the digital interpolator 1632 via, for example, a register. In step 1604, the FC digital core 1630 may enable the active SI functionality via, for example, a trace. At this point, a feedback loop for the digital interpolator 1632 may be closed and the clock signal for the digital interpolator 1632 may be locked to zero phase. In step 1606, a start command may be sent from the FC digital core 1630 to the digital interpolator 1632. On the digital interpolator 1632 side, the feedback loop is opened, the phase is set and a delay is introduced. In step 608, the digital interpolator 1632 may generate and issue a ready signal to the FC digital core 1630. On the FC digital core side, the BER is accumulated and a loop count may be incremented.

In step 1610, the FC digital core 1630 may initiate a stop command. Upon receiving the stop command, the feedback loop is locked back to zero phase by the digital interpolator 1632. In step 1612, the FC digital core may initiate a start command. On the digital interpolator side, the feedback loop is opened, the phase is set and a delay established. In response to the start command, in step 1614, the digital interpolator 1632 may initiate a ready indication. Upon receiving the ready signal, the FC digital core 1630 accumulates the BER and increments the loop count accordingly.

In step 1616, the FC digital core 1630 may initiate a stop command. Upon receiving the stop command, the feedback loop is locked back to zero phase by the digital interpolator 1632. In step 1618, the FC digital core may initiate a start command. On the digital interpolator 1632 side, the feedback loop is opened, the phase is set and a delay established. In response to the start command, in step 1620, the digital interpolator 1632 may initiate a ready indication. Upon receiving the ready signal, the FC digital core 1630 accumulates the BER and increments the loop count accordingly.

In step 1622 the FC digital core 1630 may initiate a stop command. Upon receiving the stop command, the feedback loop is locked back to zero phase by the digital interpolator 1632. In step 1624, the FC digital core 1630 may initiate a start command. On the digital interpolator side, the feedback loop is opened, the phase is set and a delay established. In response to the start command, in step 1628, the digital interpolator 1632 may initiate a ready indication. Prior to the digital interpolator 1632 sending the ready command in step 1628, the FC digital core 1630 sends an END command top the digital interpolator 1632. The END command may be sent if an error threshold is reached or a counter reaches zero, for example. If the END command was not sent, then upon receiving the ready signal, the FC digital core 1630 would accumulate the BER and increment the loop count accordingly. On the digital interpolator 1632 side, the feedback loop is closed and the clock signal is locked back to zero phase.

FIG. 17 is a timing diagram 1700 that may be utilized in connection with the exemplary procedure of FIG. 16 for on-chip BER estimation in a port bypass controller, in accordance with an embodiment of the invention. Referring to FIG. 1700, there is illustrated a plurality of signals comprising, ACTIVE_SI_ENABLE 1702, START/STOP 1704 and READY 1706. The ACTIVE_SI_ENABLE signal 1702 is utilized to enable the active signal integrity functionality. The START/STOP signal 1704 controls opening of the feedback loop for the digital interpolator 1632. The READY indication 1706 is utilized to initiate BER accumulation by the FC digital core 1630. The START/STOP signal 1704 is asserted by the FC digital core 1630 and causes the feedback loop on the digital interpolator 1632 to be opened, a phase to be set and a delay introduced. When the START/STOP 1704 signal is de-asserted by the FC digital core 1630, the feedback loop is locked back to zero phase.

In operation, the ACTIVE_SI_ENABLE signal 1702 is asserted to initiate the signal integrity function. Once the ACTIVE_SI_ENABLE signal 1702 is asserted, the START/STOP 1704 signal may be asserted. While the ACTIVE_SI_ENABLE signal 1702 is asserted and the START/STOP 1704 signal is asserted, the READY signal 1706 may be asserted to begin the BER monitoring, which occurs during the BER monitoring period 1708. The monitoring period 1708 ends whenever the START/STOP signal 1706 is de-asserted. Once the START/STOP signal 1704 is de-asserted and the ACTIVE_SI_ENABLE signal 1702 is asserted, then de-assertion of the READY signal start a new bit error monitoring period. Once the ACTIVE_SI_ENABLE signal 1702 is de-asserted, then Active-SI is disabled. The period 1710 between which the START/STOP signal 1704 is asserted and the READY signal 1706 is asserted may introduce deterministic and random delays.

Various embodiment of the invention may comprise two monitoring modes, three error accumulator counters per slice for each channel, and a shared auxiliary (AUX) channel. A plurality of counters may be utilized for each slice or phase shift sampling point. These may include, but are not limited to, an 8B/10B code violation counter, a CRC counter, and an ordered set counter. The CRC counter and the ordered set counter may be utilized for BER estimation. A plurality of slice periods, for example 10 μsec, 100 μsec, 1 msec, 10 msec, 100 msec, and 1 sec may be utilized. Either a 20-bit counter may be utilized for each fibre channel for up to 100 msec slice period or a 24-bit counter may be utilized for each fibre channel for up to 1 sec slice period. Bit error rate estimation from $10^{-3}$ to $10^{-8}$ may be done with a single slice period. For lower bit error rates, the counter values for several periods may be extremely accumulated and the result divided by the sum of all these time-periods. Other size counters may be utilized to accommodate different bit error rate estimations in accordance with various aspects of the invention. A single shared auxiliary (AUX) channel may also be provided for online Active SI and Active LI functionality. For the initialization mode, the monitoring mode may bypass the 8B/10B decoder and may lock onto a predefined pattern. This may provide a more accurate BER for different phase shift sampling positions. Normal mode is the current monitoring mode.

FIG. 18 is a block diagram 1800 of an exemplary architecture of a FC-Core comprising a shared auxiliary channel that may be utilized in connection with onboard BER estimation, in accordance with an embodiment of the invention. Referring to FIG. 18, the FC-Core, may comprise an analog core 1802 and a digital core 1804. The analog core 1802 may comprise an active signal integrity block 1806 and a serializer/deserializer (SERDES) block 1808. The active signal integrity block may comprise an interpolator 1812 and a demultiplexer (DEMUX) block 1810. The SERDES block 1808 may comprise a plurality of SERDES DEMUXs 1814 and a plurality of SERDES MUXs 1816. The plurality of SERDES DEMUXs 1814 may also be referred to as DEMUX block 1814 and the plurality of SERDES MUXs 1816 may also be referred to as DEMUX block 1816. The digital core 1804 may further comprise a microprocessor interface 1820, an active line integrity block 1822, an 8B/10B decoder block 1824 and elastic FIFO (EFIFO) block 1826 a phase FIFO 1828 and an 8B/10B encoder 1830. Both the active line integrity block 1822 and the active signal integrity block 1812 may be controlled via the microprocessor interface block 1820.

The serializer/deserializer (SERDES) block 1808 may be adapted to convert a parallel data stream into a serial data stream and vice versa. The 8B/10B decoder block 1824 may be a standardized 8B/10B compliant decoder that may be utilized to decode 10 bits of data into 8 bits of data or an 8-bit word. In another example, the 8B/10B decoder block 1824 may decode 20 bits of data into 10 bits of data or a 10-bit word. The 8B/10B encoder block 1830 may be a standardized 8B/10B compliant encoder that may be utilized to encode 8 bits of data into 10 bits of data or a 10-bit word. In another example, the 8B/10B encoder block 1830 may encode 10 bits of data into 16 bits of data or a 16-bit word. Although the DEMUXs 1814 are illustrated as 1:20 DEMUXs and the MUXs 1816 are illustrated as 20:1 MUXs, the invention is not so limited and other values such as 1:10, 1:30, 1:40 and so on may also be utilized.

The FC-Core of FIG. 18 may be adapted to provide sharing of an auxiliary channel among four active channels in order to introduce phase interpolation. Accordingly, the FC-Core may be configured to camp on a particular channel and execute a phase shifting routine covering, for example, 33 sampling points. The FC-Core may then camp on another channel and execute a phase shifting routine covering, for example, 33 sampling points. Accordingly, the FC-Core may camp on to a plurality of channels and process each one in a round-robin fashion. In another embodiment of the invention, the FC-Core of FIG. 18 may be configured to camp on selected channels rather than camping on all available channels.

In operation, the received serial data stream 1832 may be received by the DEMUXs 1814 and the interpolator 1812 may select which of the received serial data stream signals will be utilized. The received data stream 1832 may be, for example 20 bits wide. In this case, the output signal 1836 may be 10 bits wide. In another example, the received data stream 1832 may be, for example 16 bits wide. In this case, the output signal 1836 may be 8 bits wide.

The interpolator 1812 may be hardware and/or software driven and may be controlled by a microprocessor via the microprocessor interface 1820. The interpolator 1812 may be adapted to select a position of the sampling point of the incoming signals in the data stream based on analysis of the clock associated with each signal when compared to one or more reference signals. Although the interpolator 1812 may be a closed loop system, during active signal integrity, the active signal integrity block 1806 may open the closed loop in order to fix the phase for a specified period of time. For example, the phase may be fixed at ±10° off the data eye. Once the loop is opened, monitoring of the received data stream may occur and data may be accumulated for analysis. The loop may then be closed by the active signal integrity block 1806 in order to allow the interpolator 1812 to move back to the center of the data eye.

The signal selected by the interpolator 1812 may be transferred to the DEMUX 1810, where it may be demultiplexed and transferred to the active line interface block 1822 for processing. The active line interface block 1822 may be adapted to analyze FC layer 2 or FC1, and FC layer 1 which is the physical layer or FC0.

The output of the DEMUX block 1814 may be transferred to the output MUX 1840, thereby bypassing the EFIFO 1826. In this regard, the FC-Core is operating in a repeater mode with no retiming occurring. Accordingly, the resulting output signal is cleaned up only with respect to the SERDES block 1816.

The output of the DEMUX block 1814 may also be transferred to the EFIFO 1826 in order to generate a FC-retimed signal. This retimed signal generated by the EFIFO 1826 may be transferred to the output MUX 1840. The retimed signal generated by the EFIFO 1826 may also be transferred to the 8B/10B decoder block 1824. A resulting output signal generated by the 8B/10B decoder block 1824 may be utilized, for example, by switches which may be required to perform layer 2 (L2) and other upper layer processing. This provides a transparent and non-intrusive methodology for monitoring the received data stream 1808.

On the transmit side, retimer and repeater processing operations may be carried out on input parallel signals 1838 by the phase FIFO block 1828. The resulting parallel output of the phase FIFO block 1828 may be multiplexed and transferred to the MUX block 1816 for processing to produce the serialized output 1834. The input parallel signals 1838 may be encoded by the 8B/10B encoder block 1830, multiplexed and transferred to the MUX block 1816 for processing to produce the serialized output 1834. For example, 8-bit input parallel signals 1838 may be encoded by the 8B/10B encoder block 1830 to produce a corresponding 10-bit signal. The corresponding encoded 10-bit signal may be multiplexed and transferred to the MUX block 1816 for processing to produce 10-bit serialized output 1834. Similarly, 16-bit input parallel signals 1838 may be encoded by the 8B/10B encoder block 1830 to produce a corresponding 20-bit signal. The corresponding encoded 20-bit signal may be multiplexed and transferred to the MUX block 1816 for processing to produce 10-bit serialized output 1834.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for bit error estimation in a port bypass controller, the method comprising:

receiving via a port of the port bypass controller, a data stream comprising at least one known bit pattern;

locking onto at least a portion of said known bit pattern in said received data stream; and generating a bit error rate based on a bit-by-bit comparison of at least a portion of said data stream received after said locking onto at least a portion of said known bit pattern.

2. The method according to claim 1, comprising comparing said at least a portion of said data stream with a corresponding portion of expected data.

3. The method according to claim 2, comprising calculating said bit error rate based on results from said comparing of said at least a portion of said data stream with a corresponding portion of expected data.

4. The method according to claim 1, wherein said at least one known bit pattern is internally generated within the port bypass controller.

5. The method according to claim 1, wherein said at least one known bit pattern is externally generated by a host system.

6. The method according to claim 1, comprising selecting said port of said port bypass controller prior to said receiving.

7. The method according to claim 6, comprising transferring said data stream to said selected port of said port bypass controller.

8. The method according to claim 1, wherein said data stream comprises standardized stress frame patterns.

9. The method according to claim 1, wherein said data stream comprises a plurality of user defined transmission words.

10. The method according to claim 1, wherein said data stream comprises a plurality of ordered set sequences.

11. A machine-readable storage having stored thereon, a computer program having at least one code section for bit error estimation in a port bypass controller, the at least one code section being executed by a machine for causing the machine to perform steps, comprising:

receiving via a port of the port bypass controller, a data stream comprising at least one known bit pattern;

locking onto at least a portion of said known bit pattern in said received data stream; and generating a bit error rate based on a bit-by-bit comparison of at least a portion of said data stream received after said locking onto at least a portion of said known bit pattern.

12. The machine-readable storage according to claim 11, comprising code for comparing said at least a portion of said data stream with a corresponding portion of expected data.

13. The machine-readable storage according to claim 12, comprising code for calculating said bit error rate based on results from said comparing of said at least a portion of said data stream with a corresponding portion of expected data.

14. The machine-readable storage according to claim 11, wherein said at least one known bit pattern is internally generated within the port bypass controller.

15. The machine-readable storage according to claim 11, wherein said at least one known bit pattern is externally generated by a host system.

16. The machine-readable storage according to claim 11, comprising code for selecting said port of said port bypass controller prior to said receiving.

17. The machine-readable storage according to claim 16, comprising code for transferring said data stream to said selected port of said port bypass controller.

18. The machine-readable storage according to claim 11, wherein said data stream comprises standardized stress frame patterns.

19. The machine-readable storage according to claim 11, wherein said data stream comprises a plurality of user defined transmission words.

20. The machine-readable storage according to claim 11, wherein said data stream comprises a plurality of ordered set sequences.

21. A system for bit error estimation in a port bypass controller, the system comprising:

a port of the port bypass controller that receives a data stream comprising at least one known bit pattern;

said port locks onto at least a portion of said known bit pattern in said received data stream; and at least one processor generating a bit error rate based on a bit-by-bit comparison of at least a portion of said data stream received after said locking onto at least a portion of said known bit pattern.

22. The system according to claim 21, wherein said at least one processor compares said at least a portion of said data stream with a corresponding portion of expected data.

23. The system according to claim 22, wherein said at least one processor calculates said bit error rate based on results from said comparing of said at least a portion of said data stream with a corresponding portion of expected data.

24. The system according to claim 21, wherein said at least one known bit pattern is internally generated within the port bypass controller.

25. The system according to claim 21, wherein said at least one known bit pattern is externally generated by a host system.

26. The system according to claim 21, wherein said at least one processor selects said port of said port bypass controller prior to said receiving.

27. The system according to claim 26, wherein said at least one processor transfers said data stream to said selected port of said port bypass controller.

28. The system according to claim 21, wherein said data stream comprises standardized stress frame patterns.

29. The system according to claim 21, wherein said data stream comprises a plurality of user defined transmission words.

30. The system according to claim 21, wherein said data stream comprises a plurality of ordered set sequences.

31. The system according to claim 21, wherein said at least one processor is a host processor.

* * * * *